United States Patent [19]

Sagane et al.

[11] Patent Number: 5,696,214
[45] Date of Patent: Dec. 9, 1997

[54] PROCESS FOR PREPARING ETHYLENE-α-OLEFIN-NONCONJUGATED POLYENE RANDOM COPOLYMER

[75] Inventors: Toshihiro Sagane; Toshiyuki Tsutsui, both of Yamaguchi; Masaaki Kawasaki, Ichihara; Keiji Okada, Ichihara; Hidenari Nakahama, Ichihara; Tetsuo Tojo, Ichihara, all of Japan

[73] Assignee: Mitsui Petrochemical Industries, Ltd., Tokyo, Japan

[21] Appl. No.: 575,678

[22] Filed: Dec. 19, 1995

[30] Foreign Application Priority Data

Dec. 20, 1994 [JP] Japan .................. 6-316951
Mar. 17, 1995 [JP] Japan .................. 7-059289
Dec. 6, 1995 [JP] Japan .................. 7-318400

[51] Int. Cl.$^6$ .................. C08F 4/64; C08F 236/20
[52] U.S. Cl. .................. 526/170; 526/126; 526/127; 526/131; 526/132; 526/160; 526/161; 526/282; 526/336; 526/943
[58] Field of Search .................. 526/282, 281, 526/283, 308, 336, 160, 170, 161, 943, 126, 127, 131, 132; 524/554, 570, 576, 579

[56] References Cited

U.S. PATENT DOCUMENTS 5,292,845  3/1994  Kawasaki et al. .................. 526/160 X
5,304,614  4/1994  Winter et al. .................. 526/127
5,491,207  2/1996  Hoel .................. 526/160 X

FOREIGN PATENT DOCUMENTS 0549900   7/1993   European Pat. Off. .
0552946   7/1993   European Pat. Off. .
0629631   12/1994  European Pat. Off. .
0643078   3/1995   European Pat. Off. .
2047254   11/1980  United Kingdom .

*Primary Examiner*—Fred Teskin
*Attorney, Agent, or Firm*—Sherman and Shalloway

[57] ABSTRACT

Disclosed is a process for preparing an ethylene-α-olefin-nonconjugated polyene random copolymer comprising random copolymerizing (a) ethylene, (b) an α-olefin of 3 or more carbon atoms and (c) a nonconjugated polyene in the presence of a metallocene catalyst containing a specific metallocene compound. The ethylene-α-olefin-nonconjugated polyene random copolymer prepared by the process has such properties that (i) the copolymer contains units derived from ethylene (a) and units derived from the α-olefin of 3 or more carbon atoms (b) in a molar ratio of 40/60 to 95/5 [(a)/(b)], (ii) the iodine value is 1 to 50, (iii) the intrinsic viscosity ($\eta$) is more than 0.1 dl/g and less than 8.0 10 dl/g, (iv) the intensity ratio D of $T\alpha\beta$ to $T\alpha\alpha$ in the $^{13}$C-NMR spectrum, $T\alpha\beta/T\alpha\alpha$, is not more than 0.5, (v) the B value is 1.00 to 1.50, (vi) the glass transition temperature Tg is not higher than −50° C., and (vii) the ratio $g\eta^*$ of the intrinsic viscosity ($\eta$) of this copolymer defined above to the intrinsic viscosity ($\eta$)$_{blank}$ of a straight-chain ethylene-propylene copolymer having the same weight-average molecular weight as this random copolymer and having an ethylene content of 70% by mol, ($\eta$)/($\eta$)$_{blank}$, is more than 0.9. Also disclosed is a vulcanizable rubber composition containing the random copolymer. The ethylene-α-olefin-nonconjugated polyene random copolymer and the rubber composition are excellent in mechanical strength, weathering resistance, ozone resistance, processability, low-temperature flexibility and heat resistance.

2 Claims, 1 Drawing Sheet

PROCESS FOR PREPARING ETHYLENE-α-OLEFIN-NONCONJUGATED POLYENE RANDOM COPOLYMER

FIELD OF THE INVENTION

The present invention relates to a process for preparing an ethylene-α-olefin-nonconjugated polyene random copolymer, and more particularly to a process for preparing an ethylene-α-olefin-nonconjugated polyene random copolymer by which an ethylene-α-olefin-nonconjugated polyene random copolymer having a narrow composition distribution and excellent in low-temperature flexibility and heat aging resistance can be obtained in a high yield and high conversion ratio of α-olefin. The present invention also relates to copolymer obtained by the present process.

The present invention further relates to uses of the ethylene-α-olefin-nonconjugated polyene random copolymer.

BACKGROUND OF THE INVENTION

Ethylene-α-olefin rubbers such as an ethylene-propylene copolymer rubber (EPM) which is a random copolymer of ethylene and propylene and an ethylene-propylene-diene copolymer rubber (EPDM) which further contains ethylidenenorbornene as diene have molecular structures containing no unsaturated bond in the main chains and are superior to general-purpose conjugated diene rubbers in heat resistance and weathering resistance. Therefore, they have been widely used as materials of automobile parts, electrical wire materials, building and civil engineering materials and industrial materials.

The ethylene-α-olefin rubbers are generally used after vulcanized, and the properties of the vulcanized rubbers vary depending on ethylene content, molecular weight, iodine value, etc., so that the rubbers different in these property values are appropriately used according to use application.

For example, use of EPM or EPDM having a high ethylene content makes it possible to obtain vulcanized products of high heat resistance, or use of EPM or EPDM having a low ethylene content makes it possible to obtain vulcanized products of good low-temperature flexibility.

By the way, among various uses of rubbers, rubber vibration insulators such as brake parts and engine mounts are desired to have particularly good heat resistance and low-temperature flexibility.

However, even if the values of ethylene content, molecular weight, iodine value, etc. are varied, it is difficult to obtain vulcanized products satisfactory in heat resistance and low-temperature flexibility required for the rubber vibration insulators from the conventionally known EPM or EPDM. Therefore, EPM or EPDM has been rarely applied to such uses.

Accordingly, now desired is the advent of the ethylene-α-olefin-nonconjugated polyene copolymer and vulcanized products thereof which are improved in the aforementioned problems, and excellent in heat resistance and low temperature flexibility.

Though the advent of the copolymer, especially ethylene-α-olefin ($C_4$ or more)-nonconjugated polyene copolymer is desired, such copolymer has not been existed until now.

The ethylene-α-olefin-nonconjugated polyene random copolymer (EPDM) are conventionally prepared by the use of vanadium type catalyst. However, it is difficult to industrially prepare an ethylene-$C_{4 \, or \, more}$ α-olefin-nonconjugated polyene random copolymer by the use of the conventionally known vanadium catalyst, because if ethylene, an α-olefin of 4 or more carbon atoms and a nonconjugated polyene, e.g., ethylidenenorbornene (sometimes referred to as "ENB" hereinafter) or 7-methyl-1,6-octadiene (sometimes referred to as "MOD" hereinafter), are copolymerized in the presence of the vanadium catalyst, the molecular weight is not raised and the polymerization activity is markedly lowered as compared with the case of preparing the EPDM.

In the case where ethylene, an α-olefin such as propylene and the ENB or MOD are copolymerized in the presence of a solid titanium catalyst known as a catalyst for preparing polyethylene or polypropylene, the resulting copolymer has a wide composition distribution and shows poor vulcanization properties. Moreover, in the solution polymerization process, a component of high ethylene content is precipitated, and therefore it becomes difficult to perform polymerization in the uniform solution state.

Japanese Patent Laid-Open Publication No. 51512/1990 discloses an unsaturated ethylene-α-olefin random copolymer which can be subjected to high-speed vulcanization differently from the conventional unsaturated ethylene-α-olefin random copolymers, and Japanese Patent Laid-Open Publication No. 64111/1990 discloses a process for preparing EPDM of low crystallinity and high molecular weight using a catalyst comprising a metallocene compound of titanium, zirconium or hafnium and aluminoxane by a slurry polymerization.

In either publication, however, there is no description on the preparation of an ethylene-α-olefin-nonconjugated polyene random copolymer having a narrow composition distribution and excellent in mechanical strength, low-temperature flexibility and heat aging resistance by copolymerizing ethylene, an α-olefin of 4 or more carbon atoms and a nonconjugated polyene with high activity.

Further, in the case of copolymerizing ethylene, α-olefin of 3 or more carbon atoms and nonconjugated polyene using the conventionally known catalyst, there arise such a problem that ethylene-α-olefin-nonconjugated polyene random copolymer containing the α-olefin of 3 or more carbon atoms in high content is hardly obtained since the reaction ratio (conversion ratio) of α-olefin of 3 or more carbon atoms is lower than ethylene. Accordingly, now desired is a process for preparing an ethylene-$C_{3 \, or \, more}$ α-olefin-nonconjugated polyene random copolymer in which ethylene, an α-olefin of 3 or more carbon atoms and a nonconjugated polyene can be copolymerized with high activity, and high conversion ratio of α-olefin, and an ethylene-α-olefin-nonconjugated polyene random copolymer having a narrow composition distribution, high molecular weight and excellent in low-temperature flexibility and heat aging resistance can be prepared.

OBJECT OF THE INVENTION

The present invention has been made under such circumstances as described above, and it is an object of the invention to provide a process for preparing an ethylene-α-olefin-nonconjugated polyene random copolymer having high molecular weight in which ethylene, an α-olefin of 3 or more carbon atoms and a nonconjugated polyene can be copolymerized with high activity, high conversion ratio of α-olefin, and excellent randomness.

It is another object of the invention to provide an ethylene-α-olefin-nonconjugated polyene random copolymer obtained by said process, which has a narrow composition distribution and excellent in mechanical strength, low-temperature flexibility and heat aging resistance.

It is a further object of the invention to provide uses of the ethylene-α-olefin-nonconjugated polyene random copolymer, particularly to provide a vulcanizable rubber composition containing the copolymer and excellent in not only mechanical strength, weathering resistance and ozone resistance but also low-temperature resistance (low-temperature flexibility) and heat resistance.

SUMMARY OF THE INVENTION

The process for preparing an ethylene-α-olefin-nonconjugated polyene random copolymer according to the present invention is a process for preparing the below-specified ethylene-α-olefin-nonconjugated polyene random copolymer, comprising random copolymerizing (a) ethylene, (b) an α-olefin of 3 or more carbon atoms and (c) a nonconjugated polyene in the presence of a metallocene catalyst containing a metallocene compound represented by the following formula (I) or (II).

The metallocene compound used in the invention is represented by the following formula (I) or (II):

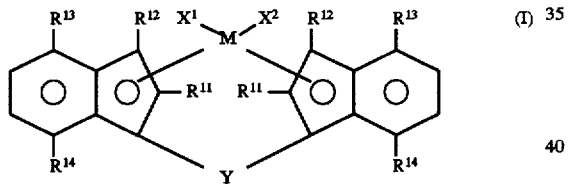

wherein

M is a transition metal of Group IVB of the periodic table, $R^{11}$ and $R^{12}$ may be the same as or different from each other, and are each hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group, $R^{13}$ is an alkyl group of 1 to 20 carbon atoms, $R^{14}$ is an alkyl group of 1 to 20 carbon atoms, $X^1$ and $X^2$ may be the same as or different from each other, and are each hydrogen, a halogen atom, a hydrocarbon group of 1 to 20 carbon atoms, a halogenated hydrocarbon group of 1 to 20 carbon atoms, a silicon-containing group, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^{15}$—, —P(R$^{15}$)—, —P(O) (R$^{15}$)—, —BR$^{15}$— or —AlR$^{15}$— (R$^{15}$ is hydrogen, a halogen atom, a hydrocarbon group of 1 to 20 carbon atoms or a halogenated hydrocarbon group of 1 to 20 carbon atoms);

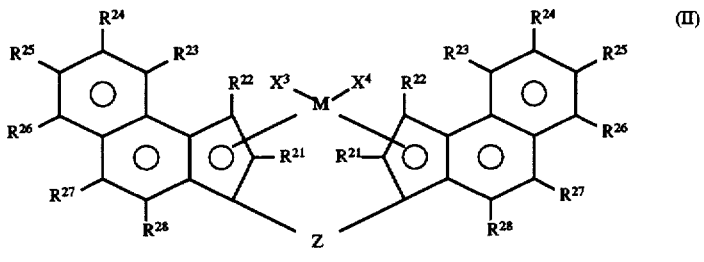

wherein

M is a transition metal of Group IVB of the periodic table, $X^3$ and $X^4$ may be the same as or different from each other, and are each hydrogen, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms, an arylalkenyl group of 8 to 40 carbon atoms, OH group or a halogen atom, plural $R^{21}$ may be the same as or different from each other, and are each hydrogen, a halogen atom, an alkyl group of 1 to 10 carbon atoms which may be halogenated, an aryl group of 6 to 10 carbon atoms, —NR$_2$, —SR, —OSiR$_3$, —SiR$_3$ or —PR$_2$ (R is a halogen atom, an alkyl group of 1 to 10 carbon atoms or an aryl group of 6 to 10 carbon atoms), $R^{22}$ to $R^{28}$ are each the same as $R^{21}$, or adjacent two of $R^{22}$ to $R^{28}$ may form an aromatic or aliphatic ring together with atoms bonded to them, and Z is

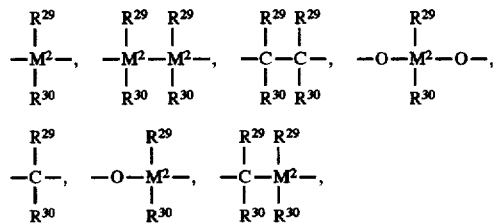

$=BR^{29}$, $=AlR^{29}$, —Ge—, —Sn—, —O—, —S—, $=SO$, $=SO_2$, $=NR^{29}$, $=CO$, $=PR^{29}$ or $=P(O)R^{29}$ ($R^{29}$ and $R^{30}$ may be the same as or different from each other, and are each hydrogen, a halogen atom, an alkyl group of 1 to 10 carbon atom, a fluoroalkyl group of 1 to 10 carbon atoms, an aryl group of 6 to 10 carbon atom, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon atoms or an alkylaryl group of 7 to 40 carbon atoms, or $R^{29}$ and $R^{30}$ may form a ring together with atoms bonded to them, and $M^2$ is silicon, germanium or tin).

The ethylene-α-olefin-nonconjugated polyene random copolymer obtained by the present invention preferably has the following properties:

(i) said copolymer contains units derived from ethylene (a) and units derived from the a-olefin of 3 or more carbon atoms (b) in a molar ratio of 40/60 to 95/5 [(a)/(b)], (ii) the iodine value is in the range of 1 to 50, (iii) the intrinsic viscosity (η), as measured in Decalin (dechydronaphthalene, E. I. du Pont de Nemours & Co., Wilmington, Del.) at 135° C., is in the range of 0.1 to 8.0 dl/g, (iv) the intensity ratio D of Tαβ to Tαα in the $^{13}$C-NMR spectrum, Tαβ/Tαα, is not more than 0.5, (v) the B value, as determined by the $^{13}$C-NMR spectrum and the following formula, is in the range of 1.00 to 1.50, B value=$[P_{OE}]/(2 \cdot [P_E] \cdot [P_O])$ wherein $[P_E]$ is a molar fraction of the units derived from ethylene (a) in the random copolymer, $[P_O]$ is a molar fraction of the units derived from the a-olefin (b) in the random copolymer, and $[P_{OE}]$ is a proportion of the number of the α-olefin-ethylene sequences to the number of all the dyad sequences in the random copolymer, (vi) the glass transition temperature Tg, as measured by DSC, is not higher than –50° C., and (vii) the ratio gη* of the intrinsic viscosity (η) of the random copolymer defined above to the intrinsic viscosity (η)$_{blank}$ of a linear ethylene-propylene copolymer having the same weight-average molecular weight (by light scattering method) as the ethylene-α-olefin-nonconjugated polyene random copolymer and having an ethylene content of 70% by mol, (η)/(η)blank, is more than 0.9.

The α-olefin (b) for forming the ethylene-α-olefin-nonconjugated polyene random copolymer is preferably an α-olefin of 4 to 10 carbon atoms.

The vulcanizable rubber composition according to the present invention contains the above-mentioned ethylene-α-olefin-nonconjugated polyene random copolymer.

The vulcanizable rubber composition of the invention may further contain other components than the ethylene-α-olefin-nonconjugated polyene random copolymer. For example, the rubber composition can contain a reinforcing agent and/or an inorganic filler in an amount of 10 to 200 parts by weight and a softening agent in an amount of 10 to 200 parts by weight, based on 100 parts by weight of the ethylene-(α-olefin-nonconjugated polyene random copolymer.

The vulcanized rubber according to the present invention is obtained from the above-mentioned rubber composition.

DETAILED DESCRIPTION OF THE INVENTION

Figure 1:
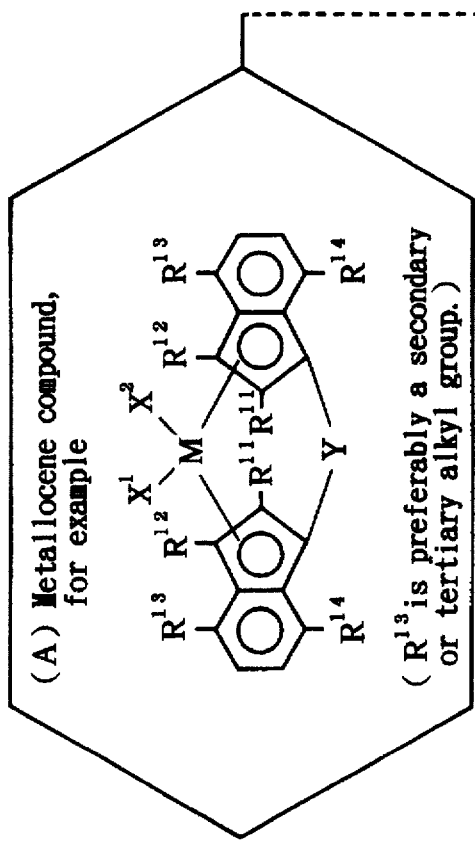
FIG. 1 is an explanatory view showing steps of a process for preparing a Group IVB transition metal compound catalyst used in the process for preparing an ethylene-α-olefin-nonconjugated polyene random copolymer according to the present invention.

In the process for preparing an ethylene-α-olefin-nonconjugated polyene random copolymer according to the invention, (a) ethylene, (b) an α-olefin of 3 or more carbon atoms and (c) a nonconjugated polyene are copolymerized in the presence of the later-described specific metallocene catalyst to prepare an ethylene-α-olefin-nonconjugated polyene random copolymer having the properties described below.

First, the ethylene-α-olefin-nonconjugated polyene random copolymer prepared by the invention is described in detail.

Ethylene-α-olefin-nonconjugated polyene random copolymer

The ethylene-α-olefin-nonconjugated polyene random copolymer (sometimes referred to as "random copolymer" hereinafter) is prepared from (a) ethylene, (b) an α-olefin of 3 or more carbon atoms and (c) a specific nonconjugated polyene.

The α-olefin of 3 or more carbon atoms (b) is specifically an α-olefin of 3 to 20 carbon atoms. Examples of the α-olefins of 3 to 20 carbon atoms include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. These α-olefins may be used in combination.

Of these, preferred are α-olefins of 4 to 10 carbon atoms, and particularly preferred are 1-butene, 1-hexene and 1-octene.

Examples of the nonconjugated polyenes (c) include:
aliphatic polyenes, such as
  1,4-hexadiene, 1,5-hexadiene, 1,6-heptadiene, 1,6-octadiene, 1,7-octadiene, 1,8-nonadiene, 1,9-decadiene, 1,13-tetradecadiene, 1,5,9-decatriene,
  3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene,
  5-methyl-1,4-heptadiene, 5-ethyl-1,4-heptadiene, 5-methyl-1,5-heptadiene, 6-methyl-1,5-heptadiene, 5-ethyl-1,5-heptadiene, 3-methyl-1,6-heptadiene, 4-methyl- 1,6-heptadiene, 4,4-dimethyl-1,6-heptadiene, 4-ethyl-1,6-heptadiene,
  4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene,
  4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene,7-ethyl-1,7-nonadiene,
  5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene,
  6-methyl-1,6-undecadiene and 9-methyl-1,8-undecadiene;
alicyclic polyenes, such as
  vinylcyclohexene, vinylnorbornene, 5-ethylidene-2-norbornene, dicyclopentadiene, cyclooctadiene, 2,5-norbornadiene,
  1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyloocatane, 1,5-diallylcyclooctane, 1-allyl-4-isopropenylcyclohexane, 1-isopropenyl-4-vinylcyclohexane and 1-isopropenyl-3-vinylcyclopentane;

aromatic polyenes, such as divinylbenzene and vinylisopropenylbenzene.

These nonconjugated polyenes may be used in combination of two or more kinds.

Of these, nonconjugated polyenes having 7 or more carbon atoms, e.g., 7-methyl-1,6-octadiene (MOD), 5-ethylidene-2-norbornene (ENB) and dicyclopentadiene (DCPD), are preferably used in the invention.

(i) Ratio of (a) ethylene component to (b) α-olefin component [(a)/(b)]

The ethylene-α-olefin-nonconjugated polyene random copolymer provided by the invention contains units derived from ethylene (a) and units derived from the α-olefin of 3 or more carbon atoms (b) (sometimes referred to simply as "α-olefin (b)" hereinafter) in a molar ratio of 40/60 to 95/5 [(a)/(b)], preferably 55/45 to 90/10.

When this random copolymer is used as a blend with a conjugated diene rubber, the molar ratio (a)/(b) is preferably in the range of 65/35 to 80/20. From the random copolymer of this ratio and the conjugated diene rubber, a rubber composition having high mechanical strength and capable of exhibiting characteristics of rubbers even at low temperatures can be obtained.

(ii) Iodine value

The iodine value of the ethylene-α-olefin-nonconjugated polyene random copolymer, that is one index of the amount of the nonconjugated polyene component, is in the range of 1 to 50, preferably 5 to 40.

(iii) Intrinsic viscosity (η)

The intrinsic viscosity (η) of the ethylene-α-olefin-nonconjugated polyene random copolymer, as measured in Decalin (dechydronaphthalene, E. I. du Pont de Nemours & Co., Wilmington, Del.) at 135° C., is in the range of 0.1 to 8.0 dl/g, preferably 0.2 dl/g to 6 dl/g.

When this random copolymer is used as a blend with a conjugated diene rubber, the intrinsic viscosity (η) is particularly preferably 0.3 dl/g to 5 dl/g. The random copolymer having an intrinsic viscosity (η) of this range is excellent in blending properties (compatibility) with the conjugated diene rubber, and from the random copolymer and the conjugated diene rubber, a vulcanizable rubber composition excellent in not only mechanical strength but also heat resistance and weathering resistance can be obtained.

(iv) Tαβ/Tαα

The intensity (area) ratio D of Tαβ to Tαα of the ethylene-α-olefin-nonconjugated polyene random copolymer in the $^{13}$C-NMR spectrum, Tαβ/Tαα, is not more than 0.5. The intensity ratio D of the random copolymer varies depending on the kind of the α-olefin (b) for constituting the random copolymer, but it is preferably not more than 0.1, more preferably not more than 0.05.

Tαβ and Tαα in the $^{13}$C-NMR spectrum are each a peak intensity of $CH_2$ in the units derived from the α-olefin of 3 or more carbon atoms (b), and they mean two kinds of $CH_2$ different in the position to the tertiary carbon as shown below.

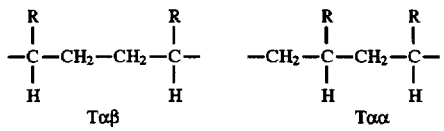

The intensity ratio D of the random copolymer can be determined in the following manner.

The $^{13}$C-NMR spectrum of the random copolymer is measured using a hexachlorobutadiene/$d_6$-benzene (2/1 by volume) mixed solution of a sample (concentration: 5% by weight) at 25° C. and 67.8 mHz on the basis of $d_6$-benzene (128 ppm) by means of a NMR measuring device (e.g., JEOL-GX270 produced by Japan Electron Optics Laboratory Co., Ltd.).

The $^{13}$C-NMR spectrum thus measured was analyzed basically in accordance with the proposals of Lindemann Adams (Analysis Chemistry 43, p 1,245 (1971)) and J. C. Randall (Review Macromolecular Chemistry Physics, C29, 201 (1989)).

The intensity ratio D is now described in more detail with reference to an ethylene-1-butene-7-methyl-1,6-octadiene random copolymer.

In the $^{13}$C-NMR spectrum of the ethylene-1-butene-7-methyl-1,6-octadiene random copolymer, the peak which appears at 39 to 40 ppm is assigned to Tαα, and the peak which appears at 31 to 32 ppm is assigned to Tαβ.

The intensity ratio D is calculated as a ratio between the integrated values of those peak areas.

The intensity ratio D thus obtained is considered an index of a proportion of occurrence of the 2,1-insertion reaction of 1-butene after the 1,2-insertion reaction or an index of a proportion of occurrence of the 1,2-insertion reaction after the 2,1-insertion reaction. Therefore, as the intensity ratio D becomes larger, the linkage direction of the α-olefin (1-butene) becomes more irregular. To the contrary, as the D value becomes smaller, the linkage direction of the α-olefin (1-butene) becomes more regular. When the regularity is high, the molecular chains tend to be assembled and the random copolymer tends to have high strength, and preferred in the present invention.

In the present invention, a random copolymer having the intensity ratio D of not more than 0.5 is obtained by copolymerizing ethylene, an α-olefin of 3 or more carbon atoms and a nonconjugated polyene using a catalyst containing a Group IVB metallocene compound, as described later. However, even if ethylene, 1-butene and 7-methyl-1, 6-octadiene are copolymerized in the presence of a Group VB metallocene (e.g., vanadium) catalyst, an ethylene-1-butene-7-methyl-1,6-octadiene copolymer having the intensity ratio D of not more than 0.5 cannot be obtained. The same applies to other α-olefins than 1-butene.

(v) B value

The B value of the ethylene-α-olefin-nonconjugated polyene random copolymer, as determined by the $^{13}$C-NMR spectrum and the following formula, is in the range of 1.00 to 1.50, preferably 1.02 to 1.50, more preferably 1.02 to 1.45, particularly preferably 1.02 to 1.40.

$$B \text{ value} = [P_{OE}]/(2 \cdot [P_E] \cdot [P_O])$$

wherein [$P_E$] is a molar fraction of the units derived from ethylene (a) in the random copolymer, [$P_O$] is a molar fraction of the units derived from the α-olefin (b) in the random copolymer, and [$P_{OE}$] is a proportion of the number of the α-olefin-ethylene sequences to the number of all the dyad sequences in the random copolymer.

This B value is an index of a distribution state of the ethylene (a) and the α-olefin (b) in the random copolymer, and it can be determined based on the reports by J. C. Randall (Macromolecules, 15, 353 (1982)) and J. Ray (Macromolecules, 10, 773 (1977)).

As the B value becomes larger, the block-like sequence of the ethylene (a) or the α-olefin (b) becomes shorter, and this means that the sequence distribution of ethylene and the α-olefin is uniform and the composition distribution of the random copolymer is narrow. As the B value becomes smaller (particularly smaller than 1), the composition distribution of the random copolymer is widened, and such random copolymer does not sufficiently exhibit its properties such as strength when vulcanized, differently from a random copolymer of narrow composition distribution.

In the present invention, a random copolymer having the B value of 1.00 to 1.50 is obtained by copolymerizing ethylene, an α-olefin of 3 or more carbon atoms and a nonconjugated polyene using a Group IVB metallocene compound catalyst, as described later. However, even if ethylene, an α-olefin of 3 or more carbon atoms and a nonconjugated polyene are copolymerized in the presence of a non-metallocene type titanium catalyst, an ethylene-α-olefin-nonconjugated polyene random copolymer having the B value of the above range cannot be obtained.

(vi) Glass transition temperature Tg

The glass transition temperature Tg of the ethylene-α-olefin-nonconjugated polyene random copolymer, as measured by DSC (differential scanning calorimeter), is not higher than −50° C.

From the random copolymer having a glass transition temperature Tg of not higher than −50° C., a vulcanizable rubber composition of good low-temperature flexibility can be obtained.

The random copolymer provided by the invention, e.g., a random copolymer of ethylene, 1-butene and ethylidenenorbornene (ENB), has a glass transition temperature Tg lower by about 5° to 10° C. than that of an ethylene-propylene-ENB random copolymer (EPDM) having the same monomer ratio between ethylene, α-olefin and polyene as this random copolymer, and this random copolymer shows excellent low-temperature properties.

(vii) gη* value

The gη* value is defined as a ratio of the intrinsic viscosity (η) of the ethylene-α-olefin-nonconjugated polyene random copolymer measured above to the intrinsic viscosity (η)$_{blank}$ of a linear ethylene-propylene copolymer which has the same weight-average molecular weight (by light scattering method) as the ethylene-α-olefin-nonconjugated polyene random copolymer and has an ethylene content of 70% by mol (gη*=(η)/(η)$_{blank}$).

Specificatlly, (η)$_{blank}$ is determined by converting a weight-average molecular weight M$_w$ of the ethylene-α-olefin-nonconjugated polyene random copolymer measured by the light scattering method to a viscosity-average molecular weight M$_v$, and then introducing the obtained M$_v$ into the following formula (I).

$$(\eta)_{blank}=7.2\times10^{-4}M_v^{0.667} \quad (1)$$

The gη* value of the ethylene-α-olefin-nonconjugated polyene random copolymer preferably exceeds 0.9.

The ethylene-α-olefin-nonconjugated polyene random copolymer may be modified with polar monomers, and the modified product will be described later in detail.

Preparation of ethylene-α-olefin-nonconjugated polyene random copolymer

In the present invention, the above-described specific ethylene-α-olefin-nonconjugated polyene random copolymer is obtained by random copolymerizing (a) ethylene, (b) the α-olefin of 3 or more carbon atoms and (c) the nonconjugated polyene in the presence of a specific metallocene catalyst.

The metallocene catalyst used in the invention contains a specific metallocene compound (A) described below.

There is no specific limitation on the metallocene catalyst used in the invention, except that the metallocene catalyst contains the metallocene compound (A). For example, the metallocene catalyst may be formed from (A) the metallocene compound and (B) an organoaluminum oxycompound and/or (C) a compound which reacts with the metallocene compound (A) to form an ion pair, or the catalyst may be formed from the component (A), the component (B) and/or the component (C), and (D) an organoaluminum compound.

These components are described below in detail.

FIG. 1 shows steps of one example of a process for preparing a metallocene catalyst used in the invention and steps of one example of a process for preparing an ethylene-α-olefin-nonconjugated polyene random copolymer.

(A) Metallocene Compound

In the invention, a compound represented by the following formula (I) or (II) is used as the metallocene compound (A).

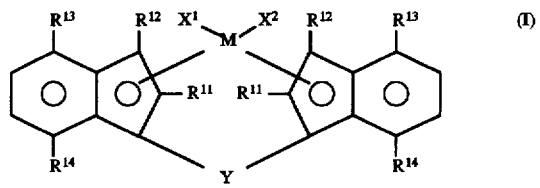

(I)

In the formula (I), M is a transition metal atom of Group IVB of the periodic table, specifically zirconium, titanium or hafnium, preferably zirconium.

R$^{11}$ and R$^{12}$

R$^{11}$ and R$^{12}$ may be the same as or different from each other, and are each hydrogen, a halogen atom, a hydrocarbon group of 1 to 20 carbon atoms which may be halogenated, a silicon-containing group, an oxygen-containing group, a sulfur-containing group, a nitrogen-containing group or a phosphorus-containing group.

Examples of the hydrocarbon groups of 1 to 20 carbon atoms include:

alkyl groups, such as methyl, ethyl, propyl, n-butyl, isobutyl, sec-butyl, tert-butyl, pentyl, neopentyl, hexyl, cyclohexyl, octyl, nonyl, dodecyl, icosyl, norbornyl and adamantyl;

alkenyl groups, such as vinyl, propenyl and cyclohexenyl;

arylalkyl groups, such as benzyl, phenylethyl and phenylpropyl; and aryl groups, such as phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl.

These hydrocarbon groups may be substituted with halogen atoms such as fluorine, chlorine, bromine and iodine; and organosilyl groups such as trimethylsilyl, triethylsilyl and triphenylsilyl.

Examples of the silicon-containing groups include monohydrocarbon substituted silyls, such as methylsilyl and phenylsilyl; di-hydrocarbon substituted silyls, such as dimethylsilyl and diphenylsilyl; tri-hydrocarbon substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylphenyl.

The silicon-containing groups further include groups represented by $—SiR_3$ (R is a halogen atom, an alkyl group of 1 to 10 carbon atoms or an aryl group of 6 to 10 carbon atoms) except the above groups.

Examples of the oxygen-containing groups include hydroxyl groups; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

The oxygen-containing groups further include groups represented by $—OSiR_3$ (R is a halogen atom, an alkyl group of 1 to 10 carbon atoms or an aryl group of 6 to 10 carbon atoms).

Examples of the sulfur-containing groups include substituents obtained by replacing oxygen with sulfur in the above-exemplified oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzenesulfinato, p-toluenesulfinato, trimethylbenzenesulfinato and pentafluorobenzenesulfinato.

The sulfur-containing groups further include groups represented by —SR (R is a halogen atom, an alkyl group of 1 to 10 carbon atoms or an aryl group of 6 to 10 carbon atoms) except the above groups.

Examples of the nitrogen-containing groups include amino groups; alkylamino groups, such as methylamino, dimethylamino, diethylamino, dipropylamino and dibutylamino, dicyclohexylamino; arylamino groups, such as phenylamino, diphenylamino, ditolylamino and dinaphthylamino; and alkylarylamino groups such as methylphenylamino.

The nitrogen-containing groups further include groups represented by $—NR_2$ (R is a halogen atom, an alkyl group of 1 to 10 carbon atoms or an aryl group of 6 to 10 carbon atoms) except the above groups.

Examples of the phosphorus-containing groups include dimethylphosphino and diphenylphosphino.

The phosphorus-containing groups further include groups represented by $—PR_2$ (R is a halogen atom, an alkyl group of 1 to 10 carbon atoms or an aryl group of 6 to 10 carbon atoms) except the above groups.

Of these, preferred as $R^{11}$ is a hydrocarbon group, particularly a hydrocarbon group of 1 to 3 carbon atoms, i.e., methyl, ethyl or propyl.

Of these, preferred as $R^{12}$ is hydrogen or a hydrocarbon group, particularly hydrogen or a hydrocarbon group of 1 to 3 carbon atoms, i.e., methyl, ethyl or propyl.

$R^{13}$ and $R^{14}$ $R^{13}$ and $R^{14}$ are each an alkyl group of 1 to 20 carbon atoms, and examples thereof are those described above. $R^{13}$ is preferably a secondary or tertiary alkyl group. $R^{14}$ may contain a double bond or a triple bond.

$X^1$ and $X^2$ $X^1$ and $X^2$ may be the same as or different from each other, and are each hydrogen, a halogen atom, a hydrocarbon group of 1 to 20 carbon atoms, a halogenated hydrocarbon group of 1 to 20 carbon atoms, a silicon-containing group, an oxygen-containing group or a sulfur-containing group. Examples of these groups are identical with the groups described above for $R^{11}$. Of those groups, preferred is a halogen atom or a hydrocarbon group of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^{15}$-, —P(R15)—, —P(O)(R$^{15}$)—, —BR$^{15}$— or —AlR$^{15}$— (R$^{15}$ is hydrogen, a halogen atom, a hydrocarbon group of 1 to 20 carbon atoms which may be substituted with halogen, or an alkoxy group).

Particular examples of the above groups include:

divalent hydrocarbon groups of 1 to 20 carbon atoms, such as alkylene groups (e.g., methylene, dimethylmethylene, 1,2-ethylene, dimethyl-1,2-ethylene, 1,3-trimethylene, 1,4-tetramethylene, 1,2-cyclohexylene and 1,4-cyclohexylene), and arylalkylene groups (e.g., diphenylmethylene and diphenyl-1,2-ethylene);

divalent halogenated hydrocarbon groups obtained by halogenating the above-exemplified divalent hydrocarbon groups of 1 to 20 carbon atoms, such as chloromethylene;

divalent silicon-containing groups, such as alkylsilylene, alkylarylsilylene and arylsilylene groups (e.g., silylene, methylsilylene, dimethylsilylene, diethylsilylene, di(n-propyl)silylene, di(i-propypropyl)silylene, di(cyclohexyl)silylene, methylphenylsilylene, diphenylsilylene, di(p-tolyl)silylene and di(p-chlorophenyl)silylene), and alkyldisilyl, alkylaryldisilyl and aryldisilyl groups (e.g., tetramethyl-1,2-disilyl and tetraphenyl-1,2-disilyl); and divalent germanium-containing groups obtained by replacing silicon with germanium in the above-exemplified divalent silicon-containing groups.

Examples of the divalent silicon-containing groups, divalent germanium-containing groups and divalent tin-containing groups include groups containing silicon, germanium or tin among the later-described groups as examples of Z in the following formula (II).

Of the above groups, preferred are substituted silylene groups such as dimethylsilylene, diphenylsilylene and methylphenylsilylene.

$R^{15}$ is the same halogen atom, hydrocarbon group of 1 to 20 carbon atoms or halogenated hydrocarbon group of 1 to 20 carbon atoms as described above.

Of these, preferred are divalent silicon-containing groups and divalent germanium-containing groups. More preferred are divalent silicon-containing groups, and particularly preferred are alkylsilylene, alkylarylsilylene and arylsilylene.

In the metallocene compound used in the invention, two ligands having a cyclopentadienyl skeleton, which are linked to each other by way of Y, may be the same as or different from each other.

Listed below are examples of the metallocene compounds represented by the above formula (I).

rac-Dimethylsilylene-bis{1-(2,7-dimethyl-4-ethylindenyl)}zirconium dichloride, rac-Dimethylsilylene-bis{1-(2,7-dimethyl-4-n-propylindenyl)}zirconium dichloride, rac-Dimethylsilylene-bis{1-(2,7-dimethyl-4-i-propylindenyl)}zirconium dichloride,
rac-Dimethylsilylene-bis{1-(2,7-dimethyl-4-n-butylindenyl)}zirconium dichloride,
rac-Dimethylsilylene-bis{1-(2,7-dimethyl-4-sec-butylindenyl)}zirconium dichloride,
rac-Dimethylsilylene-bis{1-(2,7-dimethyl-4-t-butylindenyl)}zirconium dichloride,
rac-Dimethylsilylene-bis{1-(2,7-dimethyl-4-n-pentylindenyl)}zirconium dichloride,
rac-Dimethylsilylene-bis{1-(2,7-dimethyl-4-n-hexylindenyl)}zirconium dichloride,
rac-Dimethylsilylene-bis{1-(2,7-dimethyl-4-cyclohexylindenyl)}zirconium dichloride,
rac-Dimethylsilylene-bis{1-(2,7-dimethyl-4-methylcyclohexylindenyl)}zirconium dichloride,
rac-Dimethylsilylene-bis{1-(2,7-dimethyl-4-phenylethylindenyl)}zirconium dichloride,
rac-Dimethylsilylene-bis{1-(2,7-dimethyl-4-phenyldichloromethylindenyl)}zirconium dichloride,
rac-Dimethylsilylene-bis{1-(2,7-dimethyl-4-chloromethylindenyl)}zirconium dichloride,
rac-Dimethylsilylene-bis{1-(2,7-dimethyl-4-trimethylsilylmethylindenyl)}zirconium dichloride,
rac-Dimethylsilylene-bis{1-(2,7-dimethyl-4-trimethylsiloxymethylindenyl)}zirconium dichloride,
rac-Diethylsilylene-bis{1-(2,7-dimethyl-4-i-propylindenyl)}zirconium dichloride,
rac-Di(i-propyl)silylene-bis{1-(2,7-dimethyl-4-i-propylindenyl)}zirconium dichloride,
rac-Di(n-butyl)silylene-bis{1-(2,7-dimethyl-4-i-propylindenyl)}zirconium dichloride,
rac-Di(cyclohexyl)silylene-bis{1-(2,7-dimethyl-4-i-10 propylindenyl)}zirconium dichloride
rac-Methylphenylsilylene-bis{1 -(2,7-dimethyl-4-i-propylindenyl)}zirconium dichloride,
rac-Methylphenylsilylene-bis{1-(2,7-dimethyl-4-t-butylindenyl)}zirconium dichloride,
rac-Diphenylsilylene-bis{1-(2,7-dimethyl-4-t-butylindenyl)}zirconium dichloride,
rac-Diphenylsilylene-bis{1-(2,7-dimethyl-4-i-propylindenyl)}zirconium dichloride,
rac-Diphenylsilylene-bis{1-(2,7-dimethyl-4-ethylindenyl)}zirconium dichloride,
rac-Di(p-tolyl)silylene-bis{1-(2,7-dimethyl-4-i-propylindenyl)}zirconium dichloride,
rac-Di(p-chlorophenyl)silylene-bis{1-(2,7-dimethyl-4-i-propylindenyl)}zirconium dichloride,
rac-Dimethylsilylene-bis{1-(2-methyl-4-i-propyl-7-ethylindenyl)}zirconium dichloride,
rac-Dimethylsilylene-bis{1-(2,3,7-trimethyl-4-ethylindenyl)}zirconium dichloride,
rac-Dimethylsilylene-bis{1-(2,3,7-trimethyl-4-n-propylindenyl)}zirconium dichloride,
rac-Dimethylsilylene-bis{1-(2,3,7-trimethyl-4-i-propylindenyl)}zirconium dichloride,
rac-Dimethylsilylene-bis{1-(2,3,7-trimethyl-4-n-butylindenyl)}zirconium dichloride,
rac-Dimethylsilylene-bis{1-(2,3,7-trimethyl-4-sec-butylindenyl)}zirconium dichloride,
rac-Dimethylsilylene-bis{1-(2,3,7-trimethyl-4-t-butylindenyl)}zirconium dichloride,
rac-Dimethylsilylene-bis{1-(2,3,7-trimethyl-4-n-pentylindenyl)}zirconium dichloride,
rac-Dimethylsilylene-bis{1-(2,3,7-trimethyl-4-n-hexylindenyl)}zirconium dichloride,
rac-Dimethylsilylene-bis{1-(2,3,7-trimethyl-4-cyclohexylindenyl)}zirconium dichloride,
rac-Dimethylsilylene-bis{1-(2,3,7-trimethyl-4-methylcyclohexylindenyl)}zirconium dichloride,
rac-Dimethylsilylene-bis{1-(2,3,7-trimethyl-4-trimethylsilylmethylindenyl)}zirconium dichloride,
rac-Dimethylsilylene-bis{1-(2,3,7-trimethyl-4-trimethylsiloxymethylindenyl)}zirconium dichloride,
rac-Dimethylsilylene-bis{1-(2,3,7-trimethyl-4-phenylethylindenyl)}zirconium dichloride,
rac-Dimethylsilylene-bis{1-(2,3,7-trimethyl-4-phenyldichloromethylindenyl)}zirconium dichloride,
rac-Dimethylsilylene-bis{1-(2,3,7-trimethyl-4-chloromethylindenyl)}zirconium dichloride,
rac-Diethylsilylene-bis{1-(2,3,7-trimethyl-4-i-propylindenyl)}zirconium dichloride,
rac-Di(i-propyl)silylene-bis{1-(2,3,7-trimethyl-4-i-propylindenyl)}zirconium dichloride,
rac-Di(n-butyl)silylene-bis{1-(2,3,7-trimethyl-4-i-propylindenyl)}zirconium dichloride,
rac-Di(cyclohexyl)silylene-bis{1-(2,3,7-trimethyl-4-i-propylindenyl)}zirconium dichloride,
rac-Methylphenylsilylene-bis{1-(2,3,7-trimethyl-4-i-propylindenyl)}zirconium dichloride,
rac-Methylphenylsilylene-bis{1-(2,3,7-trimethyl-4-t-butylindenyl)}zirconium dichloride,
rac-Diphenylsilylene-bis{1-(2,3,7-trimethyl-4-t-butylindenyl)}zirconium dichloride,
rac-Diphenylsilylene-bis{1-(2,3,7-trimethyl-4-i-propylindenyl)}zirconium dichloride,
rac-Diphenylsilylene-bis{1-(2,3,7-trimethyl-4-ethylindenyl)}zirconium dichloride,
rac-Di(p-tolyl)silylene-bis{1-(2,3,7-trimethyl-4-i-propylindenyl)}zirconium dichloride,
rac-Di(p-chlorophenyl)silylene-bis{1-(2,3,7-trimethyl-4-i-propylindenyl)}zirconium dichloride,
rac-Dimethylsilylene-bis{1-(2-methyl-4-i-propyl-7-methylindenyl)}zirconium dimethyl,
rac-Dimethylsilylene-bis{1-(2-methyl-4-i-propyl-7-methylindenyl)}zirconium methylchloride,
rac-Dimethylsilylene-bis{1-(2-methyl-4-i-propyl-7-methylindenyl)}zirconium-bis(methanesulfonato),
rac-Dimethylsilylene-bis{1-(2-methyl-4-i-propyl-7-methylindenyl)}zirconium-bis(p-phenylsulfinato),
rac-Dimethylsilylene-bis{1-(2-methyl-3-methyl-4-i-propyl-7-methylindenyl)}zirconium dichloride,
rac-Dimethylsilylene-bis{1-(2-ethyl-4-i-propyl-7-methylindenyl)}zirconium dichloride,
rac-Dimethylsilylene-bis{1-(2-phenyl-4-i-propyl-7-methylindenyl)}zirconium dichloride,
rac-Dimethylsilylene-bis{1-(2-methyl-4-i-propyl-7-methylindenyl)}titanium dichloride, and
rac-Dimethylsilylene-bis{1-(2-methyl-4-i-propyl-7-methylindenyl)}hafnium dichloride.

Also employable are compounds obtained by replacing zirconium with titanium or hafnium in the above-exemplified compounds.

Of these, particularly preferred are compounds having a branched alkyl group such as i-propyl, sec-butyl or tert butyl at the 4-position.

In the invention, a racemic modification of the above-mentioned metallocene compound is generally used as the olefin polymerization catalyst component, but R type or S type is also employable.

The metallocene compounds may be used in combination of two or more kinds.

The metallocene compounds can be prepared from indene derivatives by known processes, for example, a process described in Japanese Patent Laid-Open Publication No. 268307/1992.

In the invention, a compound represented by the following formula (II), which is described in European Patent No. 549,900 and Canadian Patent No. 2,084,017, is also employable as the metallocene compound (A).

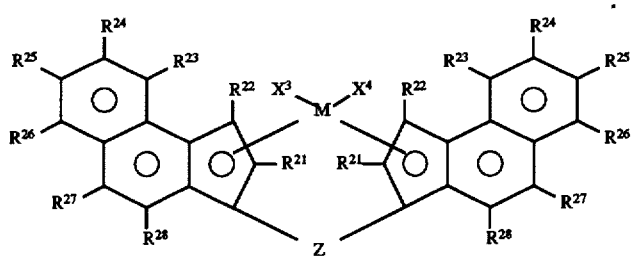

(II)

In the formula (II),

M is a transition metal atom of Group IVB of the periodic table, specifically titanium, zirconium or hafnium, particularly preferably zirconium, $X^3$ and $X^4$ may be the same as or different from each other, and are each hydrogen, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms, an arylalkenyl group of 8 to 40 carbon atoms, OH group or a halogen atom, plural $R^{21}$ may be the same as or different from each other, and are each hydrogen, a halogen atom, an alkyl group of 1 to 10 carbon atoms which may be halogenated, an aryl group of 6 to 10 carbon atoms, —NR$_2$, —SR, —OSiR$_3$, —SiR$_3$ or —PR$_2$ (R is a halogen atom, an alkyl group of 1 to 10 carbon atoms or an aryl group of 6 to 10 carbon atoms), $R^{22}$ to $R^{28}$ are each the same as $R^{21}$, or adjacent two of $R^{22}$ to $R^{28}$ may form an aromatic or aliphatic ring together with atoms bonded to them, and Z is

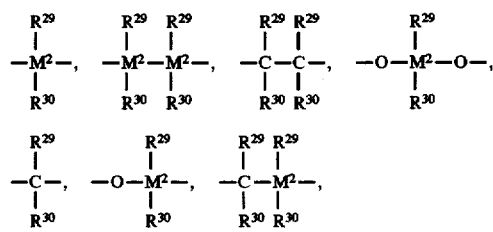

=BR$^{29}$, =AlR$^{29}$, —Ge, —Sn—, —O—, —S—, =SO, =SO$_2$, =NR$^{29}$, =CO, =PR$^{29}$ or =P(O)R$^{29}$ (R$^{29}$ and R$^{30}$ may be the same as or different from each other, and are each hydrogen, a halogen atom, an alkyl group of 1 to 10 carbon atom, a fluoroalkyl group of 1 to 10 carbon atoms, an aryl group of 6 to 10 carbon atom, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon atoms or an alkylaryl group of 7 to 40 carbon atoms, or $R^{29}$ and $R^{30}$ may form a ring together with atoms bonded to them, and $M^2$ is silicon, germanium or tin).

The alkyl group is a straight chain or branched alkyl group, and the halogen (halogenation) is fluorine, chlorine, bromine or iodine, preferably fluorine or chlorine.

The substituents $R^{22}$ to $R^{28}$ of the two indenyl ligands may be the same as or different from each other (see: definition of $R^{21}$).

$X^3$ and $X^4$ may be the same as or different from each other, and are each hydrogen, an alkyl group of 1 to 10 carbon atoms, preferably 1 to 3 carbon atoms; an alkoxy group of 1 to 10 carbon atoms, preferably 1 to 3 carbon atoms; an aryl group of 6 to 10 carbon atoms, preferably 6 to 8 carbon atoms; an aryloxy group of 6 to 10 carbon atoms, preferably 6 to 8 carbon atoms; an alkenyl group of 2 to 10 carbon atoms; preferably 2 to 4 carbon atoms; an arylalkyl group of 7 to 40 carbon atoms, preferably 7 to 10 carbon atoms; an alkylaryl group of 7 to 40 carbon atoms; preferably 7 to 12 carbon atoms; an arylalkenyl group of 8 to 40 carbon atoms, preferably 8 to 12 carbon atoms; OH group, or a halogen atom, preferably chlorine.

The residual groups $R^{21}$ to $R^{28}$ may be the same as or different from each other, and are each hydrogen, a halogen atom, preferably fluorine, chlorine or bromine, an alkyl group of 1 to 10 carbon atoms, preferably 1 to 4 carbon atoms, which may be halogenated; an aryl group of 6 to 10 carbon atoms, preferably 6 to 8 carbon atoms; —NR$_2$, —SR, —OSiR$_3$, —SiR$_3$ or —PR$_2$. R is a halogen atom, preferably chlorine, an alkyl group of 1 to 10 carbon atoms, preferably 1 to 3 carbon atoms; or an aryl group of 6 to 10 carbon atoms, preferably 6 to 8 carbon atoms.

Z is

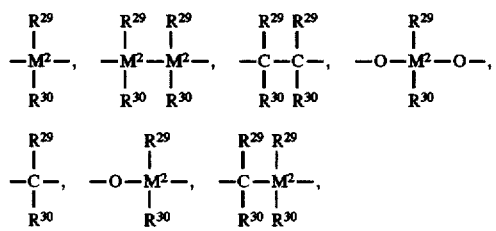

=BR$^{29}$, =AlR$^{29}$, —Ge, —Sn—, —O—, —S—, =SO, =SO$_2$, =NR$^{29}$, =CO, =PR$^{29}$ or =P(O)R$^{29}$. R$^{29}$ and R$^{30}$ may be the same as or different from each other, and are each hydrogen, a halogen atom, an alkyl group of 1 to 10 carbon atom, preferably 1 to 4 carbon atoms, more preferably methyl; a fluoroalkyl group of 1 to 10 carbon atoms, preferably CF$_3$; an aryl group of 6 to 10 carbon atom, preferably 6 to 8 carbon atoms; a fluoroaryl group of 6 to 10 carbon atoms, preferably pentafluorophenyl; an alkoxy group of 1 to 10 carbon atoms, preferably 1 to 4 carbon atoms, more preferably methoxy; an alkenyl group of 2 to 10 carbon atoms, preferably 2 to 4 carbon atoms; an arylalkyl group of 7 to 40 carbon atoms, preferably 7 to 10 carbon atoms; an arylalkenyl group of 8 to 40 carbon atoms, preferably 8 to 12 carbon atoms; or an alkylaryl group of 7 to 40 carbon atoms, preferably 7 to 12 carbon atoms, or $R^{29}$ and $R^{30}$ may form a ring together with atoms bonded to them.

$M^2$ is silicon, germanium or tin, preferably silicon or germanium.

Of the compounds of the formula (II), advantageous are compounds in which M is zirconium or hafnium; $X^3$ and $X^4$ may be the same as or different from each other, and are each an alkyl group of 1 to 3 carbon atoms or a halogen atom; the residual groups $R^{21}$ are the same as each other, and are each an alkyl group of 1 to 4 carbon atoms; $R^{22}$ to $R^{28}$ may be the same as or different from each other, and are each hydrogen or an alkyl group of 1 to 4 carbon atoms; and Z is

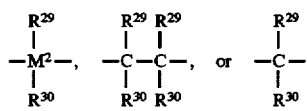

($M^2$ is silicon, and $R^{29}$ and $R^{30}$ may be the same as or different from each other, and are each an alkyl group of 1 to 4 carbon atom or an aryl group of 6 to 10 carbon atoms).

Among the compounds, preferred are compounds in which the substituents $R^{22}$ and $R^{28}$ are each hydrogen, and $R^{23}$ to $R^{27}$ are each an alkyl group of 1 to 4 carbon atoms or hydrogen.

More advantageous are compounds in which M is zirconium; $X^3$ and $X^4$ are each chlorine; the residual groups $R^{21}$ are the same as each other, and are each an alkyl group of 1 to 4 carbon atoms; $R^{22}$ and $R^{28}$ are each hydrogen; $R^{23}$ to $R^{27}$ may be the same as or different from each other, and are each an alkyl group of 1 to 4 carbon atoms or hydrogen; and Z is

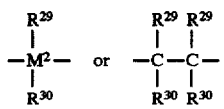

($M^2$ is silicon, and $R^{29}$ and $R^{30}$ may be the same as or different from each other, and are each an alkyl group of 1 to 4 carbon atom or an aryl group of 6 to 10 carbon atoms).

Of the compounds of the formula (II), particularly advantageous are compounds in which M is zirconium; $X^3$ and $X^4$ are chlorine; the residual groups $R^{21}$ are each methyl; $R^{22}$ to $R^{28}$ are each hydrogen; and Z is

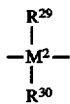

($M^2$ is silicon, and $R^{29}$ and $R^{30}$ may be the same as or different from each other, and are each methyl or phenyl).

Some preferred examples of the compounds represented by the formula (II) are described below.

rac-Dimethylsilylene-bis{1-(2-methyl-4,5-benzoindenyl)}zirconium dichloride, rac-Dimethylsilylene-bis{1-(2-methyl-4,5-acenaphthocyclopentadienyl)}zirconium dichloride, rac-Dimethylsilylene-bis{1-(2,3,6-trimethyl-4,5-benzoindenyl)}zirconium dichloride, rac-Methylphenylsilylene-bis{1-(2-methyl-4,5-benzoindenyl)}zirconium dichloride, rac-Methylphenylsilylene-bis{1-(2-methyl-4,5-acenaphthocyclopentadienyl)}zirconium dichloride, rac-Methylphenylsilylene-bis{1-(4,5-benzoindenyl)}zirconium dichloride, rac-Methylphenylsilylene-bis{1-(2,6-dimethyl-4,5-benzoindenyl)}zirconium dichloride, and rac-Methylphenylsilylene-bis{1-(2,3,6-trimethyl-4,5-benzoindenyl)}zirconium dichloride.

Such metallocene compounds as mentioned above may be used in combination of two or more kinds.

(B) Organoaluminum oxy-compound

The organoaluminum oxy-compound (B) used in the invention may be aluminoxane conventionally known or may be such a benzene-insoluble organoaluminum oxy-compound as exemplified in Japanese Patent Laid-Open Publication No. 78687/1990.

The conventionally known aluminoxane can be prepared by, for example, the following procedures.

(1) A procedure of adding an organoaluminum compound such as trialkylaluminum to a hydrocarbon medium suspension of a compound containing adsorbed water or a salt containing water of crystallization, e.g., magnesium chloride hydrate, copper sulfate hydrate, aluminum sulfate hydrate, nickel sulfate hydrate or cerous chloride hydrate, so as to perform reaction, followed by recovering aluminoxane as its hydrocarbon solution.

(2) A procedure of allowing water, ice or water vapor to directly act on an organoaluminum compound such as trialkylaluminum in a medium such as benzene, toluene, ethyl ether or tetrahydrofuran, followed by recovering aluminoxane as its hydrocarbon solution.

(3) A procedure of allowing organotin oxide such as dimethyltin oxide or dibutyltin oxide to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, particularly preferred are trialkylaluminums and tricycloalkylaluminums.

Also employable as the organoaluminum compound used for preparing the aluminoxane is isoprenylaluminum represented by the formula (i-$C_4H_9$)$_x$Al$_y$($C_5H_{10}$)$_2$ (wherein x, y, z are each a positive number, and z≧2x).

The organoaluminum compounds mentioned above may be used in combination of two or more kinds.

Examples of the solvents used for preparing the aluminoxane include:

aromatic hydrocarbons, such as benzene, toluene, xylene, cumene and cymene;

aliphatic hydrocarbons, such as pentane, hexane, heptane, octane, decane, dodecane, hexadecane and octadecane;

alicyclic hydrocarbons, such as cyclopentane, cyclohexane, cyclooctane and methylcyclopentane; petroleum fractions, such as gasoline, kerosine and gas oil; and halides of these aromatic, aliphatic and alicyclic hydrocarbons, particularly chlorides and bromides thereof.

Also employable are ethers such as ethyl ether and tetrahydrofuran. Of the solvents, particularly preferred are aromatic hydrocarbons.

The organoaluminum oxy-compounds mentioned above may be used in combination of two or more.

(C) The Compound Which Reacts with the Metallocene Compound (A) to Form an Ion Pair The compound (C) which reacts with the metallocene compound (A) to form an ion pair includes such Lewis acid, ionic compounds, borane compounds and carborane compounds as described in National Publications of international Patent No. 501950/1989 and No. 502036/1989, Japanese Patent Laid-Open Publication No. 179005/1991, No. 179006/1991, No. 207703/1991 and No. 207704/1991, and U.S. Pat. No. 547,718.

The Lewis acid includes Mg-containing Lewis acid, Al-containing Lewis acid and B-containing Lewis acid. Of these, B-containing Lewis acid is preferred.

The Lewis acid which contains a boron atom is, for example, a compound represented by the following formula:

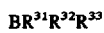

wherein $R^{31}$, $R^{32}$ and $R^{33}$ are each independently a phenyl group which may have substituents such as fluorine, methyl and trifluoromethyl, or a fluorine atom.

Examples of the compounds represented by the above formula include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron. Of these, particularly preferred is tris(pentafluorophenyl)boron.

The ionic compound employable in the invention is a salt comprising a cationic compound and an anionic compound. The anion reacts with the metallocene compound (A) to render the compound (A) cationic and to form an ion pair so as to stabilize the transition metal cation seed. Examples of such anion include organoboron compound anion, organoarsenic compound anion and organoaluminum compound anion. Preferred is such anion as is relatively bulky and stabilizes the transition metal cation seed. Examples of cation include metallic cation, organometallic cation, carbonium cation, tripium cation, oxonium cation, sulfonium cation, phosphonium cation and ammonium cation. More specifically, there can be mentioned triphenylcarbenium cation, tributylammonium cation, N,N-dimethylammonium cation, ferrocenium cation, etc.

Of these, preferred are ionic compounds containing a boron compound as anion, and examples thereof include:

trialkyl-substituted ammonium salts, such as triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron, tri(n-butyl)ammoniumtetra(o-tolyl)boron and tri(n-butyl)ammoniumtetra(4-fluorophenyl)boron;

N,N,-dialkylanilinium salts, such as N,N-dimethylaniliniumtetra(phenyl)boron, N,N-diethylaniliniumtetra(phenyl)boron and N,N-2,4,6-pentamethylaniliniumtetra(phenyl)boron;

dialkylammonium salts, such as di(n-propyl)ammoniumtetra(pentafluorophenyl)boron and dicyclohexylammoniumtetra(phenyl)boron; and triarylphosphonium salts, such as triphenylphosphoniumtetra(phenyl)boron, tri(methylphenyl)phosphoniumtetra(phenyl)boron and tri(dimethylphenyl)phosphoniumtetra(phenyl)boron.

As the ionic compounds containing a boron atom, triphenylcarbeniumtetrakis(pentafluorophenyl)borate, N,N-dimethylaniliniumtetrakis(pentafluorophenyl)borate and ferroceniumtetrakis(pentafluorophenyl)borate can be also employed in the invention.

Further, the following compounds are also employable. (In the ionic compounds enumerated below, the counter ion is tri(n-butyl)ammonium, but the counter ion is in no way limited thereto.)

That is, there can be mentioned salts of anion, for example, bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate, bis[tri(n-butyl)ammonium]dodecachlorododecaborate, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate and tri(n-butyl)ammoniumbromo-1-carbadodecaborate.

Moreover, borane compounds and carborane compounds are also employable. These compounds are employed as the Lewis acid or the ionic compounds.

Examples of the borane and carborane compounds include:

borane and carborane complex compounds and salts of carborane anion, such as decaborane (14), 7,8-dicarbaundecaborane (13), 2,7-dicarbaundecaborane (13), undecahydride-7,8-dimethyl-7,8-dicarbaundecaborane, dodecahydride-11-methyl-2,7-dicarbaundecaborane, tri(n-butyl)ammonium-6-carbadecaborate (14), tri(n-butyl)ammonium-6-carbadecaborate (12), tri(n-butyl)ammonium-7-carbaundecaborate (13), tri(n-butyl)ammonium-7,8-dicarbaundecaborate (12), tri(n-butyl)ammonium-2,9-dicarbaundecaborate (12), tri(n-butyl)ammoniumdodecahydride-8-methyl-7,9- dicarbaundecaborate, tri(n-butyl) ammoniumundecahydride-8-ethyl-7,9-dicarbaundecaborate, tri(n-butyl) ammoniumundecahydride-8-butyl-7,9-dicarbaundecaborate, tri(n-butyl) ammoniumundecahydride-8-ethyl-7,9-dicarbaundecaborate, tri(n-butyl) ammoniumundecahydride-9-trimethylsilyl-7,8-dicarbaundecaborate and tri(n-butyl) ammoniumundecahydride-4,6-dibromo-7-carbaundecaborate; and carborane and salts of carborane, such as 4-carbanonaborane (14), 1,3-dicarbanonaborane (13), 6,9-dicarbadecaborane (14), dodecahydride-1-phenyl-1,3-dicarbanonaborane, dodecahydride-1-methyl-1,3-dicarbanonaborane and undecahydride-1,3-dimethyl-1,3-dicarbanonaborane.

Furthermore, the following compounds are also employable. (In the ionic compounds enumerated below, the counter ion is tri(n-butyl)ammonium, but the counter ion is in no way limited thereto.)

That is, there can be mentioned salts of metallic carborane and metallic borane anion, for example, tri(n-butyl) ammoniumbis(nonahydride-1,3-dicarbanonaborate) cobaltate (III), tri(n-butyl)ammoniumbis(undecahydride-7,8-dicarbaundecaborate)ferrate (III), tri(n-butyl) ammoniumbis(undecahydride-7,8-dicarbaundecaborate) cobaltate (III), tri(n-butyl)ammoniumbis(undecahydride-7,8-dicarbaundecaborate)nickelate (III), tri(n-butyl) ammoniumbis(undecahydride-7,8-dicarbaundecaborate) cuprate (III), tri(n-butyl)ammoniumbis(undecahydride-7,8-dicarbaundecaborate)aurate (III), tri(n-butyl)ammoniumbis (nonahydride-7,8-dimethyl-7,8-dicarbaundecaborate)ferrate (III), tri(n-butyl)ammoniumbis(nonahydride-7,8-dimethyl-7,8-dicarbaundecaborate)chromate (III), tri(n-butyl) ammoniumbis(tribromooctahydride-7,8-dicarbaundecaborate)cobaltate (III), tri(n-butyl) ammoniumbis(dodecahydridedicarbadodecaborate) cobaltate(III), bis[tri(n-butyl)ammonium]bis (dodecahydridedodecaborate)nickelate(III), tris[tri(n-butyl) ammonium]bis(undecahydride-7-carbaundecaborate) chromate(III), bis[tri(n-butyl)ammonium]bis (undecahydride-7-carbaundecaborate) manganate (IV), bis [tri(n-butyl)ammonium]bis(undecahydride-7-carbaundecaborate)cobaltate (III)and bis[tri(n-butyl) ammonium]bis(undecahydride-7-carbaundecaborate) nickelate(IV).

The compounds(C) which react with the metallocene compound (A) to form an ion pair can be used singly or in combination of two or more kinds.

(D) Organoaluminum Compound

The organoaluminum compound (D) used in the invention can be represented by, for example, the following formula (a):

wherein $R^{40}$ is a hydrocarbon group of 1 to 12 carbon atoms, X is a halogen atom or hydrogen, and n is 1 to 3.

In the above formula (a), $R^{40}$ is a hydrocarbon group of 1 to 12 carbon atoms, e.g., an alkyl group, a cycloalkyl group or an aryl group. Particular examples thereof include methyl, ethyl, n-propyl, isopropyl, isobutyl, pentyl, hexyl, octyl, cyclopentyl, cyclohexyl, phenyl and tolyl.

Examples of such organoaluminum compounds include: trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (D) is a compound represented by the following formula (b):

wherein $R^{40}$ is the same as above; Y is —$OR^{41}$ group, —$OSiR^{42}_3$ group, —$OAlR432$ group, —$NR^{44}_2$ group, —$SiR^{45}_3$ group or —$N(R^{46})AlR^{47}_2$ group; n is 1 to 2; $R^{41}$, $R^{42}$, $R^{43}$ and $R^{47}$ are each methyl, ethyl, isopropyl, isobutyl, cyclohexyl, phenyl or the like; $R^{44}$ is hydrogen, methyl, ethyl, isopropyl, phenyl, trimethylsilyl or the like; and $R^{45}$ and $R^{46}$ are each methyl, ethyl or the like.

Examples of such organoaluminum compounds include:

(i) compounds of the formula $R^{40}_n Al(OR^{41})_{3-n}$, e.g., dimethylaluminum methoxide, diethylaluminum ethoxide and diisobutylaluminum methoxide;

(ii) compounds of the formula $R^{40}_n Al(OSiR^{42}_3)_{3-n}$, e.g., $(C_2H_5)_2Al(OSi(CH_3)_3)$, $(iso-C_4H_9)_2Al(OSi(CH_3)_3)$ and $(iso-C_4H_9)_2Al(OSi(C_2H_5)_3)$;

(iii) compounds of the formula $R^{40}_n Al(OAlR^{43}_2)_{3-n}$, e.g., $(C_2H_5)_2AlOAl(C_2H_5)_2$ and $(iso-C_4H_9)_2Al(OAl(iso-C_4H_9)_2)$;

(iv) compounds of the formula $R^{40}_n Al(NR^{44}_2)_{3-n}$, e.g., $(CH_3)_2Al(N(C_2H_5)_2)$, $(C_2H_5)_2Al(NH(CH_3))$, $(CH_3)_2Al(NH(C_2H_5))$, $(C_2H_5)_2Al[N(Si(CH_3)_3)_2]$ and $(iso-C_4H_9)_2Al[N(Si(CH_3)_3)_2]$; and (v) compounds of the formula $R^{40}_n Al(SiR^{45}_3)_{3-n}$, e.g., $(iso-C_4H_9)_2Al(Si(CH_3)_3)$.

Of these, preferred are organoaluminum compounds of the formulas $R^{40}_3Al$, $R^{40}_n Al(OR^{41})_{3-n}$ and $R^{40}_n Al(OAlR^{43}_2)_{3-n}$, and particularly preferred are compounds of said formulas wherein $R^{40}$ is an isoalkyl group and n is 2. The organoaluminum compounds mentioned above may be used in combination of two or more kinds.

The specific metallocene catalyst used in the invention contains the metallocene compound (A), and the catalyst can be prepared from the metallocene compound (A) and the organoaluminum oxy-compound (B). Further, the metallocene catalyst can be formed from the metallocene compound (A)and the compound (C) which reacts with the compound (A) to form an ion pair, or the catalyst can be formed from the metallocene compound (A), the organoaluminum oxy-compound (B) and the compound (C) which forms an ion pair. In these embodiments, it is particularly preferred to use an organoaluminum compound (D) in combination.

In the present invention, the metallocene compound (A) is used in an amount of usually about 0.00005 to 0.1 mmol, preferably about 0.0001 to 0.05 mmol, in terms of the transition metal atom, per 1 liter of the polymerization volume.

The organoaluminum oxy-compound (B) is used in such an amount that the amount of the aluminum atom becomes usually about 1 to 10,000 mol, preferably 10 to 5,000 mol, per 1 mol of the transition metal atom.

The compound (C) which reacts with the metallocene compound (A) to form an ion pair is used in such an amount that the amount of the boron atom becomes usually about 0.5 to 20 mol, preferably 1 to 10 mol, per 1 mol of the transition metal atom.

The organoaluminum compound (D) is used, if desired, in an amount of usually about 0 to 1,000 mol, preferably about 0 to 500 mol, per 1 mol of the aluminum atom in the organoaluminum oxy-compound (B) or the boron atom in the compound (C) which forms an ion pair.

When the ethylene (a), the α-olefin of 3 or more carbon atoms (b) and the nonconjugated polyene (c) are copolymerized using the above-mentioned metallocene catalyst, an ethylene-α-olefin-nonconjugated polyene random copolymer can be obtained with high polymerization activity and high α-olefin conversion ratio.

However, even if the ethylene (a), the α-olefin of 3 or more carbon atoms (b) and the nonconjugated polyene (c) are copolymerized using a Group VB transition metal compound catalyst such as a vanadium catalyst, it is impossible to obtain a random copolymer with high polymerization activity. Further, in the preparation of EPDM using the Group VB transition metal compound catalyst, the types of polyenes employable as the nonconjugated polyene (c) are often limited to norbornene ring-containing polyenes such as ENB. On the other hand, when the Group IVB metallocene catalyst is used as in the present invention, the types of polyenes employable as the nonconjugated polyene (c) are not limited to the norbornene ring-containing polyenes, and the aforesaid various types of polyenes including chain nonconjugated polyenes such as MOD can be also copolymerized.

In the copolymerization of ethylene (a), the α-olefin of 3 or more carbon atoms (b) and the nonconjugated polyene (c), the metallocene compound (A), the organoaluminum oxy-compound (B) and the compound (C) which reacts with compound (A) to form an ion pair, and if desired, the organoaluminum compound (D), all of which constitute the metallocene catalyst, may be separately fed to the polymerization reactor, or the metallocene catalyst containing the metallocene compound (A), which is preliminarily prepared, may be added to the polymerization reaction system.

In the preparation of the metallocene catalyst, hydrocarbon media which are inert to the catalyst components can be employed. Examples of the inert hydrocarbon media include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These hydrocarbons may be used in combination.

The group IVB metallocene compound (A), the organoaluminum oxy-compound (B), the compound (C) which forms an ion pair and the organoaluminum compound (D) can be contacted with each other at a temperature of usually −100° to 200° C., preferably −70° to 100° C.

In the invention, copolymerization of ethylene (a), the α-olefin of 3 or more carbon atoms (b) and the nonconjugated polyene (c) can be carried out under the conditions of a temperature of usually 40° to 200° C., preferably 50° to 150° C., particularly preferably 60° to 120° C., and a pressure of atmospheric pressure to 100 kg/cm², preferably atmospheric pressure to 50 kg/cm², particularly preferably atmospheric pressure to 30 kg/cm².

Although the copolymerization reaction can be performed by various processes, the reaction is preferably performed by a solution polymerization process. In the solution polymerization process, the aforesaid hydrocarbons are employable as the polymerization solvents.

The copolymerization can be carried out either batchwise, semi-continuously or continuously, but it is preferably carried out continuously. The polymerization can be conducted in two more stages having different reaction conditions.

The above-described specific random copolymer is obtained by the present invention, and the molecular weight of this random copolymer can be regulated by varying the polymerization conditions such as polymerization temperature or controlling the amount of hydrogen (molecular weight regulator).

The reaction product immediately after the polymerization is recovered from the polymerization solution by a known separation or recovery method and then dried, to obtain a solid random copolymer.

Modified Random Copolymer

In the invention, the ethylene-α-olefin-nonconjugated polyene random copolymer may be graft modified with polar monomers.

The polar monomers include hydroxyl group-containing ethylenic unsaturated compounds, amino group-containing ethylenic unsaturated compounds, epoxy group-containing ethylenic unsaturated compounds, aromatic vinyl compounds, unsaturated carboxylic acids or their derivatives, vinyl ester compounds and vinyl chloride.

Examples of the hydroxyl group-containing ethylenic unsaturated compounds include:

(meth)acrylates, such as hydroxyethyl (meth)acrylate, 2-hydroxypropyl (meth)acrylate, 3-hydroxypropyl (meth)acrylate, 2-hydroxy-3-phenoxypropyl(meth) acrylate, 3-chloro-2-hydroxypropyl(meth)acrylate, glycerol mono(meth)acrylate, pentaerythritol mono (meth)acrylate, trimethylolpropane mono(meth) acrylate, tetramethylolethane mono(meth)acrylate, butanediol mono(meth)acrylate, polyethylene glycol mono(meth)acrylate and 2-(6-hydroxyhexanoyloxy) ethyl acrylate; and 10-undecen-1-ol, 1-octene-3-ol, 2-methanolnorbornene, hydroxystyrene, hydroxyethyl vinyl ether, hydroxybutyl vinyl ether, N-methylolacrylamide, 2-(meth) acryloyloxyethyl acid phosphate, glycerol monoallyl ether, allyl alcohol, allyloxyethanol, 2-butene-1,4-diol and glycerol monoalcohol.

The amino group-containing ethylenic unsaturated compound is, for example, a vinyl monomer having at least one amino group or substituted amino group represented by the following formula:

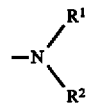

wherein $R^1$ is hydrogen, methyl or ethyl, and $R^2$ is hydrogen, an alkyl group of 1 to 12 carbon atoms (preferably 1 to 8 carbon atoms) or a cycloalkyl group of 6 to 12 carbon atoms (preferably 6 to 8 carbon atoms). The alkyl group and the cycloalkyl group may have a substituent.

Examples of the amino group-containing ethylenic unsaturated compounds include:

alkyl ester derivatives of acrylic acids or methacrylic acids, such as aminoethyl(meth)acrylate, propylaminoethyl(meth)acrylate, dimethylaminoethyl methacrylate, aminopropyl(meth)acrylate, phenylaminoethyl methacrylate and cyclohexylaminoethyl methacrylate;

vinylamine derivatives, such as N-vinyldiethylamine and N-acetylvinylamine;

allylamine derivatives, such as allylamine, methacrylamine, N-methylacrylamine, N,N-dimethylacrylamine and N,N-dimethylaminopropylacrylamine;

acrylamide derivatives, such as acrylamide and N-methylacrylamide;

aminostyrenes, such as p-aminostyrene; and 6-aminohexylsuccinimide and 2-aminoethylsuccinimide.

The epoxy group-containing ethylenic unsaturated compound employable in the invention is a monomer having at least one polymerizable unsaturated bond and at least one epoxy group in one molecule.

Examples of such epoxy group-containing ethylenic unsaturated compounds include:

glycidyl acrylate and glycidyl methacrylate;

dicarboxylic acid mono- and alkylglycidyl esters (number of carbon atoms of the alkyl group in the case of monoglycidyl esters: 1–12), such as mono- and diglycidyl esters of maleic acid, mono- and glycidyl esters of fumaric acid, mono- and diglycidyl esters of crotonic acid, mono and diglycidyl esters of tetrahydrophthalic acid, mono- and diglycidyl esters of itaconic acid, mono- and diglycidyl esters of butenetricarboxylic acid, mono- and diglycidyl esters of citraconic acid, mono- and diglycidyl esters of endo-cis-bicyclo[2,2,1]hept-5-ene-2,3-dicarboxylic acid (nadic acid™), mono- or diglycidyl esters of endo-cis-bicyclo[2,2,1]hept-5-ene-2-methyl-2,3-dicarboxylic acid (methylnadic acids), and mono- and diglycidyl esters of allylsuccinic acid; and alkyl glycidyl ester of p-styrenecarboxylic acid, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

The aromatic vinyl compound is represented by the following formula:

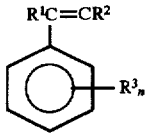

wherein $R^1$ and $R^2$ are each independently hydrogen or an alkyl group of 1 to 3 carbon atoms (e.g., methyl, ethyl, propyl or isopropyl), $R^3$ is a hydrocarbon group of 1 to 3 carbon atoms (e.g., methyl, ethyl, propyl or isopropyl) or a halogen atom (e.g., chlorine, bromine or iodine), and n is an integer of usually 0 to 5, preferably 1 to 5.

Examples of the aromatic vinyl compounds include styrene, α-methylstyrene, o-methylstyrene, p-methylstyrene, m-methylstyrene, p-chlorostyrene, m-chlorostyrene, p-chloromethylstyrene, 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

Employable as the unsaturated carboxylic acids are unsaturated carboxylic acids, such as acrylic acid, methacrylic acid, maleic acid, fumaric acid, tetrahydrophthalic acid, iraconic acid, citraconic acid, crotonic acid, isocrotonic acid, norbornenedicarboxylic acid and bicyclo[2,2,1]hept-2-ene-5,6-dicarboxylic acid; and derivatives of these acids (e.g., acid anhydrides, acid halides, amides, imides and esters).

Particular examples of the derivatives include malenyl chloride, malenylimide, maleic anhydride, iraconic anhydride, citraconic anhydride, tetrahydrophthalic anhydride, bicyclo[2,2,1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo [2,2,1]hept-2-ene-5,6-dicarboxylate, hydroxyethyl (meth) acrylate, hydroxypropyl(meth)acrylate, glycidyl (meth) acrylate, aminoethyl methacrylate and aminopropyl methacrylate.

Of these, preferred are (meth)acrylic acid, maleic anhydride, hydroxyethyl(meth)acrylate, glycidyl methacrylate and aminopropyl methacrylate.

Examples of the vinyl ester compounds include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-t-butylbenzoate, vinyl salicylate and vinyl cyclohexanecarboxylate.

Preparation of Modified Random Copolymer

The modified random copolymer is obtained by graft polymerizing the random copolymer with the polar monomer. In the graft polymerization of the random copolymer with the polar monomer, the polar monomer is used in an amount of usually 1 to 100 parts by weight, preferably 5 to 80 parts by weight, based on 100 parts by weight of the random copolymer.

The graft polymerization is generally performed in the presence of a radical initiator.

The radical initiator is, for example, organic peroxide or an azo compound.

Examples of the organic peroxides include dicumyl peroxide, di-t-butyl peroxide, 2,5-dimethyl-2,5-bis(t-butylperoxy)hexane, 2,5-dimethyl-2,5-bis(t-butylperoxy) hexyne-3, 1,3-bis(t-butylperoxyisopropyl)benzene, 1,1-(t-butylperoxy)valerate, benzoyl peroxide, t-butyl peroxybenzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide and m-toluyl peroxide.

Examples of the azo compounds include azoisobutyronitrile and dimethylazoisobutyronitrile.

The radical initiator is desirably used in an amount of about 0.001 to 10 parts by weight based on 100 parts by weight of the random copolymer.

The radical initiator can be used by mixing it with the random copolymer and the polar monomer, or can be used after dissolving it in a small amount of an organic solvent. As the organic solvent, any organic solvents can be used without specific limitation as far as they can dissolve the radical initiator. For example, there can be used aromatic hydrocarbon solvents, such as benzene, toluene and xylene;

aliphatic hydrocarbon solvents, such as pentane, hexane, heptane, octane, nonane and decane; alicyclic hydrocarbon solvents, such as cyclohexane, methylcyclohexane and decahydronaphthalene; chlorinated hydrocarbon solvents, such as chlorobenzene, dichlorobenzene, trichlorobenzene, methylene chloride, chloroform, carbon tetrachloride and tetrachloroethylene; alcohol solvents, such as methanol, ethanol, n-propanol, iso-propanol, n-butanol, sec-butanol and tert-butanol; ketone solvents, such as acetone, methyl ethyl ketone and methyl isobutyl ketone; ester solvents, such as ethyl acetate and dimethyl phthalate; and ether solvents, such as dimethyl ether, diethyl ether, di-n-amyl ether, tetrahydrofuran and dioxyanisol.

In the graft polymerization of the random copolymer with the polar monomer, a reducing material may be used. By the use of the reducing material, the graft quantity of the polar monomer can be increased.

The reducing material includes not only iron (II) ion, chromium ion, cobalt ion, nickel ion, palladium ion, sulfite, hydroxylamine and hydrazine but also compounds containing groups such as —SH, $SO_3H$, —$NHNH_2$, —COCH(OH)—.

Examples of such reducing materials include ferrous chloride, potassium bichromate, cobalt chloride, cobalt naphthenate, palladium chloride, ethanolamine, diethanolamine, N,N-dimethylaniline, hydrazine, ethylmercaptan, benzenesulfonic acid and p-toluenesulfonic acid.

The reducing material may be used in an amount of usually 0.001 to 5 parts by weight, preferably 0.1 to 3 parts by weight, based on 100 parts by weight of the random copolymer.

The graft modification of the random copolymer with the polar monomer can be carried out by a conventional known method. For example, the random copolymer is dissolved in an organic solvent, and to the solution are added the polar monomer and the radical initiator to perform reaction at a temperature of 70° to 200° C., preferably 80 to 190° C., for a reaction time of 0.5 to 15 hours, preferably 1 to 10 hours.

As the organic solvent, any organic solvents can be used without specific limitation as far as they can dissolve the random copolymer. For example, aromatic hydrocarbon solvents, such as benzene, toluene and xylene, and aliphatic hydrocarbon solvents, such as pentane, hexane and heptane, are employable.

The modified random copolymer can be also prepared by causing the random copolymer to react with the polar monomer in the absence of any solvent using an extruder or the like. In this case, the reaction is desirably conducted at a temperature not lower than the melting point of the random copolymer, specifically 120° to 250° C., for a reaction time of 0.5 to 10 minutes.

The modification quantity of the modified random copolymer thus obtained (i.e., graft quantity of the polar monomer) is desirably in the range of usually 0.1 to 50% by weight, preferably 0.2 to 30% by weight.

Vulcanizable Rubber Composition

The vulcanizable rubber composition of the invention which contains the above-described ethylene-α-olefin-nonconjugated polyene random copolymer may be used in the unvulcanized state, but if the composition is used as its vulcanizate, much more improved properties can be exhibited.

The vulcanizable rubber composition of the invention can be vulcanized by heating it using a vulcanizing agent or by irradiating it with electron rays without using a vulcanizing agent.

The vulcanizable rubber composition of the invention may appropriately contain other components than the ethylene-α-olefin-nonconjugated polyene random copolymer according to the use application, and it is desired the ethylene-α-olefin-nonconjugated polyene random copolymer is contained in an amount of not less than 20% by weight, preferably not less than 25% by weight, based on the whole amount of the rubber composition.

Examples of the other components include various chemicals such as reinforcing agent, inorganic filler, softening agent, aging inhibitor (stabilizer), processing aid, compounds which constitute foaming system (e.g., foaming agent and foaming aid), plasticizer, colorant, blowing agent and other rubbers. The kinds and the amounts of these components are properly determined according to the use application. Of these, preferably used are reinforcing agent, inorganic filler and softening agent. Details of these components are described below.

Reinforcing agent and inorganic filler

Examples of the reinforcing agents include carbon black such as SRF, GPF, FEF, MAF, HAF, ISAF, SAF, FT and MT, carbon black surface-treated with silane coupling agents, silica, activated calcium carbonate, powdery talc and powdery silicate.

Examples of the inorganic fillers include light calcium carbonate, heavy calcium carbonate, talc and clay.

In the rubber composition of the invention, the reinforcing agent and/or the inorganic filler may be contained in an amount of 10 to 300 parts by weight, preferably 10 to 200 parts by weight, based on 100 parts by weight of the ethylene-α-olefin-nonconjugated polyene random copolymer.

From the rubber composition containing the reinforcing agent in the above-mentioned amount, a vulcanized rubber improved in mechanical properties such as tensile strength, tear strength and abrasion resistance can be obtained.

If the inorganic filler is added in the above-mentioned amount, the hardness can be raised without deteriorating other properties of the vulcanized rubber, and the cost can be reduced.

Softening Agent

As the softening agents, those conventionally added to rubbers can be widely used, and examples thereof include:

petroleum type softening agents, such as process oil, lubricant, paraffin, liquid paraffin, petroleum asphalt and vaseline;

coal tar type softening agents, such as coal tar and coal tar pitch;

fatty oil type softening agents, such as castor oil, linseed oil, rapeseed oil and coconut oil;

waxes, such as tall oil, factice, beeswax, carnauba wax and lanolin;

fatty acids and fatty acid salts, such as ricinolic acid, palmitic acid, barium stearate, calcium stearate and zinc laurate; and synthetic polymer materials, such as petroleum resin, atactic polypropylene and cumarone-indene resin.

Of these, preferred are petroleum type softening agents, and particularly preferred is process oil.

The softening agent can be contained in the rubber composition of the invention in an amount of 10 to 200 parts by weight, preferably 10 to 150 parts by weight, particularly preferably 10 to 100 parts by weight, based on 100 parts by weight of the ethylene-α-olefin-nonconjugated polyene random copolymer.

Aging Inhibitor

The rubber composition of the invention preferably contains an aging inhibitor because the material life can be lengthened.

Examples of the aging inhibitors include:

aromatic secondary amine type stabilizers, such as phenylnaphthylamine, 4,4'-(α,α-dimethylbenzyl) diphenylamine and N,N'-di-2-naphthyl-p-phenylenediamine;

phenolic type stabilizers, such as 2,6-di-t-butyl-4-methylphenol and tetrakis-[methylene-3-(3',5'-di-t-butyl-4'-hydroxyphenyl)propionate]methane;

thioether type stabilizers, such as bis[2-methyl-4-(3-n-alkylthiopropionyloxy)-5-t-butylphenyl]sulfide; benzomidazole type stabilizers, such as 2-mercaptobenzomidazole;

dithiocarbamate type stabilizers, such as nickel dibutyldithiocarbamate; and quinoline type stabilizers, such as polymer of 2,2,4-trimethyl-1,2-dihydroquinoline.

These stabilizers may be used in combination of two or more kinds.

The aging inhibitor can be used in an amount of not more than 5 parts by weight, preferably not more than 3 parts by weight, based on 100 parts by weight of the ethylene-α-olefin-nonconjugated polyene random copolymer.

Processing Aid

As the processing aids, those conventionally added to rubbers can be widely used. Examples thereof include various acids, such as ricinolic acid, stearic acid, palmitic acid and lauric acid; salts of these higher fatty acids, such as barium stearate, zinc stearate and calcium stearate; and esters.

The processing aid can be used in an amount of not more than 10 parts by weight, preferably not more than 5 parts by weight, based on 100 parts by weight of the ethylene-α-olefin-nonconjugated polyene random copolymer.

Vulcanizing Agent

When the rubber composition of the invention is vulcanized by heating, compounds which constitute vulcanization system, such as a vulcanizing agent, a vulcanization accelerator and a vulcanization aid, are generally added to the rubber composition.

Examples of the vulcanizing agents employable herein include sulfur, sulfur compounds and organic peroxides.

There is no specific limitation on the type of sulfur, and for example, powdery sulfur, precipitated sulfur, colloidal sulfur, surface-treated sulfur and insoluble sulfur can be employed.

Examples of the sulfur compounds include sulfur chloride, sulfur dichloride, high-molecular weight polysulfide, morpholine disulfide, alkylphenol disulfide, tetramethylthiuram disulfide and selenium dimethyldithiocarbamate.

Examples of the organic peroxides include:

alkyl peroxides, such as dicumyl peroxide, di-t-butyl peroxide, di-t-butylperoxy-3,3,5-trimethylcyclohexane, t-butylcumyl peroxide, di-t-amyl peroxide, 2,5-dimethyl-2,5-di(t-butylperoxy)hexyne-3, 2,5-dimethyl-2,5-di(benzoylperoxy)hexane, 2,5-dimethyl-2,5-di(t-butylperoxy)hexane, α,α'-bis (t-butylperoxy-m-isopropyl)benzene and t-butyl hydroperoxide;

peroxy esters, such as t-butyl peroxyacetate, t-butyl peroxyisobutyrate, t-butyl peroxypivalate, t-butylperoxymaleic acid, t-butyl peroxyneodecanoate, t-butyl peroxybenzoate, and di-t-butyl peroxyphthalate; and ketone peroxides, such as dicyclohexanone peroxide.

These vulcanizing agents may be used in combination of two or more kinds.

Of these, preferred are organic peroxides having a temperature, at which the half-life period thereof corresponds to one minute, of 130° to 200° C., for example, dicumyl peroxide, di-t-butyl peroxide, di-t-butylperoxy-5 3,3,5-trimethylcyclohexane, t-butylcumyl peroxide, di-t-amyl peroxide and t-butyl hydroperoxide.

When the vulcanizing agent is sulfur or the sulfur compound, it is used in an amount of 0.1 to 10 parts by weight, preferably 0.5 to 5 parts by weight, based on 100 parts by weight of the ethylene-α-olefin-nonconjugated polyene random copolymer. When the vulcanizing agent is organic peroxide, it is used in an amount of 0.0003 to 0.05 mol, preferably 0.001 to 0.03 mol, based on 100 g of the ethylene-α-olefin-nonconjugated polyene random copolymer.

Vulcanization Accelerator

When sulfur or the sulfur compound is used as the vulcanizing agent, a vulcanization accelerator is preferably used in combination.

Examples of the vulcanization accelerators include: sulfenamide compounds, such as N-cyclohexyl-2-benzothiazole sulfenamide, N-oxydiethylene-2-benzothiazole sulfenamide and N,N-diisopropyl-2-benzothiazole sulfenamide;

thiazole compounds, such as 2-mercaptobenzothiazole, 2-(2,4-dinitrophenyl)mercaptobenzothiazole, 2-(2,6-diethyl-4-morpholinothio)benzothiazole, dibenzothiazyl disulfide and 2-(4'-morpholinodithio) benzothiazole;

guanidine compounds, such as diphenylguanidine, triphenylguanidine, diorthonitrileguanidine, orthonitrile biguanide and diphenylguanidine phthalate;

aldehyde amines or aldehyde-ammonia compounds, such as acetaldehyde-aniline reaction product, butylaldehydeaniline condensate, hexamethylenetetramine and acetaldehyde ammonia;

imidazoline compounds, such as 2-mercaptoimidazoline (ethylenethiourea);

thiourea compounds, such as thiocarbanilide, diethylthiourea, dibutylthiourea, trimethylthiourea and diorthotolylthiourea;

thiuram compounds, such as tetramethylthiuram monosulfide, tetramethylthiuram disulfide, tetraethylthiuram disulfide, tetrabutylthiuram disulfide and pentamethylenethiuram tetrasulfide;

dithio acid salt compounds, such as zinc dimethyldithiocarbamate, zinc diethyldithiocarbamate, zinc di-n-butyldithiocarbamate, zinc ethylphenyldithiocabamate, zinc butylphenyldithiocarbamate, sodium dimethyldithiocarbamate, selenium dimethyldithiocarbamate and tellurium dimethyldithiocarbamate;

xanthate compounds, such as zinc dibutylxanthate; and zinc white.

The vulcanization accelerator is desirably used in an amount of 0.1 to 20 parts by weight, preferably 0.2 to 10 parts by weight, based on 100 parts by weight of the ethylene-α-olefin-nonconjugated polyene random copolymer.

Vulcanization Aid (Polyfunctional Monomer)

When the organic peroxide is used as the vulcanizing agent, a vulcanization aid (polyfunctional monomer) is preferably used in combination in an amount of 0.5 to 2 mol based on 1 mol of the organic peroxide, preferably in the almost equimolar amount.

Examples of the vulcanization aids include:
sulfur;
quinonedioxime compounds, such as p-quinonedioxime;
(meth)acrylate compounds, such as trimethylolpropane triacrylate and polyethylene glycol dimethacrylate;
allyl compounds, such as diallyl phthalate and triallyl cyanurate;
maleimide compounds, such as m-phenylene bismaleimide; and
divinylbenzene.

Of the above-mentioned vulcanizing agents, sulfur or the sulfur compound, particularly sulfur, is preferably used in the invention because the properties of the rubber composition of the invention can be exhibited.

Foaming Agent

When the rubber composition of the invention contains a compound which constitutes foaming system, such as a foaming agent or a foaming aid, the composition can be subjected to foam molding.

As the foaming agents, those generally used in the foam molding of rubbers can be widely used. Particular examples thereof include inorganic foaming agents, such as sodium bicarbonate, sodium carbonate, ammonium bicarbonate, ammonium carbonate and ammonium nitrite; nitroso compounds, such as N,N'-dimethyl-N,N'-dinitrosoterephthalamide and N,N'-dinitrosopentamethylenetetramine; azo compounds, such as azodicarbonamide, azobisisobutyronitrile, azocyclohexylnitrile, azodiaminobenzene and barium azodicarboxylate; sulfonylhydrazide compounds, such as benzenesulfonylhydrazide, toluenesulfonylhydrazide, p,p'-oxybis(benzenesulfonylhydrazide)and diphenylsulfone-3,3'-disulfonylhydrazide; and azide compounds, such as calcium azide, 4,4-diphenyldisulfonyl azide and p-toluenesulfonyl azide.

Of these, preferred are nitroso compounds, azo compounds and azide compounds.

The foaming agent can be used in an amount of 0.5 to 30 parts by weight, preferably 1 to 20 parts by weight, based on 100 parts by weight of the ethylene-α-olefin-nonconjugated polyene random copolymer. From the rubber composition containing the foaming agent in the above amount, foamed products having an apparent specific gravity of 0.03 to 0.8 g/cm$^3$ can be obtained.

A foaming aid can be used in combination with the foaming agent. When the foaming aid is used in combination, various effects such as lowering of decomposition temperature of the foaming agent, acceleration of decomposition thereof and uniformity of the resulting foam can be exerted. Examples of the foaming aids include organic acids, such as salicylic acid, phthalic acid, stearic acid and oxalic acid, urea and its derivatives.

The foaming aid can be used in an amount of 0.01 to 10 parts by weight, preferably 0.1 to 5 parts by weight, based on 100 parts by weight of the ethylene-α-olefin-nonconjugated polyene random copolymer.

Other Rubber

The rubber composition of the invention may be used by blending with other rubbers within limits no prejudicial to the objects of the invention.

Examples of such rubbers include natural rubbers (NR); isoprene type rubbers, such as isoprene rubber (IR); and conjugated diene type rubbers, such as butadiene rubber (BR), styrene-butadiene rubber (SBR), acrylonitrile-butadiene rubber (NBR) and chloroprene rubber (CR).

Also employable are conventionally known ethylene-α-olefin copolymers, for example, ethylene-propylene random copolymer (EPR) and ethylene-α-olefin-nonconjugated polyene random copolymer except the aforementioned ethylene-α-olefin-nonconjugated polyene random copolymer such as EPDM.

The vulcanizable rubber composition of the invention can be prepared from the ethylene-α-olefin-nonconjugated polyene random copolymer and the above-mentioned other components by conventional processes for preparing rubber blends. For example, the ethylene-α-olefin-nonconjugated polyene random copolymer and other components are kneaded at 80° to 170° C. for 3 to 10 minutes using internal mixers such as Banbury mixer, kneader and intermixer, then the vulcanizing agent and the vulcanization accelerator or the vulcanization aid are added if necessary, and the resulting mixture is kneaded using rolls (e.g., open rolls) or a kneader at a roll temperature of 40° to 80° C. for 5 to 30 minutes, followed by rolling. Thus, a rubber composition (rubber blend) in the form of usually ribbon or sheet can be obtained. If the temperature in the kneading process using the internal mixer is low, the vulcanizing agent, the vulcanization accelerator and the foaming agent may be simultaneously kneaded.

Vulcanized Rubber

A vulcanizate (vulcanized rubber) of the rubber composition of the invention can be obtained by a process generally comprising preforming the unvulcanized rubber composition into a desired shape using various means such as an extrusion molding machine, a calender roll, a press, an injection molding machine and a transfer molding machine, and simultaneously or thereafter heating the resulting preform in a vulcanizing bath or irradiating it with electron rays so as to perform vulcanization.

When the rubber composition is vulcanized by heating, the rubber composition is preferably heated at a temperature of 150° to 270° C. for 1 to 30 minutes using a heating bath of hot air, glass bead fluidized bed, UHF (ultrahigh frequency electromagnetic wave), steam or LCM (molten salt bath).

Among such copolymer rubber compositions of the invention as mentioned above, a copolymer rubber composition containing organic peroxide as a vulcanizing agent is preferably used as a hot-air crosslinking copolymer rubber composition.

The hot-air crosslinking copolymer rubber composition which contains the ethylene-α-olefin-nonconjugated polyene random copolymer and the organic peroxide of specific amount based on the amount of the random copolymer can be sufficiently crosslinked by hot air, whereby a crosslinked product having low surface tackiness and containing no extraordinary foam inside can be obtained. Further, from the hot-air crosslinking copolymer rubber composition, a hot-air crosslinked product also excellent in resistance to setting (permanent compression set) and heat aging resistance (heat resistance) can be obtained.

The hot-air crosslinking rubber composition contains the organic peroxide in the above-mentioned amount based on the amount of the ethylene-α-olefin-nonconjugated polyene random copolymer. This composition may contain other components in addition to the organic peroxide, and the composition preferably contains a vulcanization aid (polyfunctional monomer).

The vulcanizate (vulcanized rubber) of the hot-air crosslinking rubber composition can be generally obtained by a process comprising preforming the unvulcanized rubber blend described above by various methods such as methods of using extrusion molding machine or calendar roll to give a preform of desired shape and simultaneously heating the preform or thereafter introducing the preform into a vulcanizing bath and heating it therein.

For heating the preformed vulcanized rubber blend in the vulcanizing bath, a method of using hot air, glass bead fluidized bed, UHF (ultrahigh frequency electromagnetic wave), steam or LCM (molten salt bath) can be employed, and the heating is preferably carried out at 120° to 270° C. for 1 to 30 minutes.

In the preforming and vulcanization, a mold may be used or may not be used. If a mold is not used, preforming and vulcanization of the rubber composition are generally carried out continuously.

When the rubber composition is vulcanized by irradiation with electron rays without using a vulcanizing agent, the preformed rubber composition is irradiated with electron rays having energy of 0.1 to 10 MeV, preferably 0.3 to 2 MeV at an absorbed dose of 0.5 to 35 Mrad, preferably 0.5 to 10 Mrad.

In the preforming and vulcanization, a mold may be used or may not be used. If a mold is not used, preforming and vulcanization of the rubber composition are generally carried out continuously.

The rubber composition preformed and vulcanized as above (vulcanized rubber) can be used for automotive industrial parts such as weatherstrip, door glass run channel, window frame, radiator hose, brake parts and wiper blade; industrial rubber products such as rubber roll, belt, packing and hose; electrical insulating materials such as anode cap and grommet; civil engineering and building materials such as building gasket and civil engineering sheet; and rubberized fabrics.

The vulcanized foamed product obtained by foaming the rubber blend containing the foaming agent under heating can be used for heat insulating materials, cushioning materials, sealing materials, etc.

EFFECT OF THE INVENTION

According to the process for preparing an ethylene-α-olefin-nonconjugated polyene random copolymer of the invention, ethylene, an α-olefin of 3 or more carbon atoms and a nonconjugated polyene can be copolymerized with high activity, high conversion ratio of α-olefin and high random copolymerizability to provide a copolymer having high molecular weight, though such copolymerization was unable to be attained by the conventional processes. Moreover, the process of the invention has high polymerization activity at high temperatures, and hence an ethylene-α-olefin-nonconjugated polyene random copolymer can be efficiently prepared.

Since the ethylene-α-olefin-nonconjugated polyene random copolymer prepared by the invention has such characteristics as described hereinbefore, this random copolymer has a narrow composition distribution and is excellent in heat aging resistance, weathering resistance and ozone resistance as well as in mechanical strength and low-temperature flexibility.

The vulcanizable rubber composition containing the ethylene-α-olefin-nonconjugated polyene random copolymer is excellent in mechanical strength, weathering resistance, ozone resistance, processability, low-temperature resistance (low-temperature flexibility) and heat resistance.

From the rubber composition of the invention, a vulcanized rubber molded product or foamed product excellent especially in those properties can be obtained.

EXAMPLE

The present invention will be further described with reference to the following examples, but it should be construed that the invention is in no way limited to those examples. The glass transition temperature Tg of the ethylene-α-olefin-nonconjugated polyene random copolymer was measured by means of a differential scanning calorimeter (DSC).

This glass transition temperature Tg is an index of low-temperature flexibility of the ethylene-α-olefin-nonconjugated polyene random copolymer.

Measurement of Tg by DSC

The sample was first heated up to 180° C. from room temperature (25° C.) at a rate of 20° C./min, kept at 180° C. for 2 minutes, then cooled to −80° C. at a rate of −20° C./min, kept at −80° C. for 2 minutes and again heated at a rate of 20° C., to determine Tg of the sample.

Described below are zirconium compounds used in the following examples.

Zirconium Compound A rac-Dimethylsilylene-bis{1-(2-ethyl-4-isopropyl-7-methylindenyl)}zirconium dichloride:

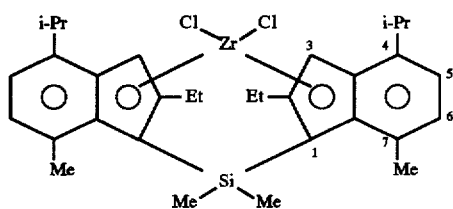

Zirconium Compound B rac-Dimethylsilylene-bis{1-(2-methyl-4,5-acenaphthocyclopentadienyl)}zirconium dichloride:

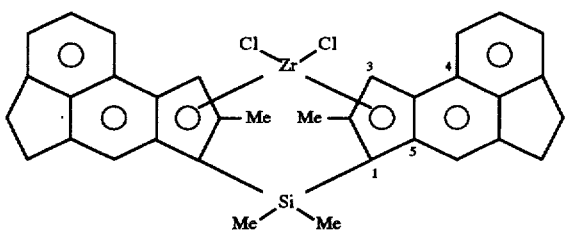

Zirconium Compound C rac-Dimethylsilylene-bis{1-(2-methyl-4,5-benzoindenyl)}zirconium dichloride:

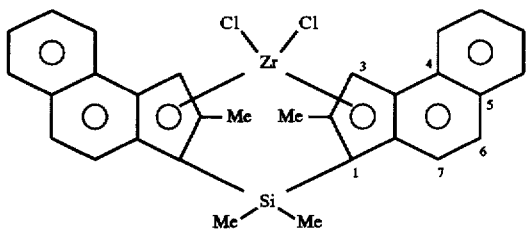

Zirconium Compound D rac-Dimethylsilylene-bis{1-(2,3, 6-trimethyl-4,5-benzoindenyl)}zirconium dichloride:

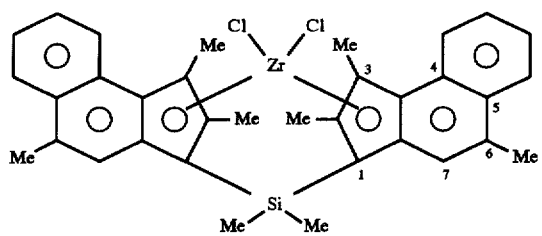

Example 1

Pre-contact of Zirconium Compound with Methylaluminoxane and Preparation of Catalyst Solution The zirconium compound A of a given amount and a toluene solution of methylaluminoxane (1.2 mg.atom/ml in terms of aluminum atom) were mixed by stirring at room temperature for 30 minutes in a dark place to prepare a toluene solution containing the zirconium compound A and methylaluminoxane. The Zr concentration in the toluene solution was 0.004 mmol/ml, and the methylaluminoxane concentration in the solution was 1.2 mg·atom/ml in terms of aluminum atom.

To the toluene solution was added hexane in an amount of five times in volume as much as the toluene with stirring to prepare a catalyst solution having the following Zr concentration and methylaluminoxane concentration. The catalyst solution was used as a catalyst for the subsequent polymerization reaction.

Zr concentration: 0.00067 mmol/ml (i.e., 0.67 mmol/l)

Methylaluminoxane concentration (in terms of Al atom): 0.20 mmol/ml (i.e., 200 mmol/l)

Polymerization

In a 15-liter stainless steel polymerization reactor equipped with a stirrer, ethylene, 1-butene and 7-methyl-1,6-octadiene were continuously copolymerized in the following manner.

First, to the polymerization reactor were continuously fed, through the top of the reactor, dehydrated and purified hexane at a feed rate of 3.185 l/hr, the catalyst solution obtained above at a feed rate of 0.015 l/hr, a hexane solution of triisobutylaluminum (concentration: 17 mmol/l) at a feed rate of 0.3 l/hr and a hexane solution of 7-methyl-1,6-octadiene (sometimes abbreviated to "MOD" hereinafter) (concentration: 0.15 l/l) at a feed rate of 1.5 l/hr.

Further, to the reactor were continuously fed, through the top thereof, ethylene at a feed rate of 200 l/hr and 1-butene at a feed rate of 155 l/hr.

The copolymerization reaction was carried out under the conditions of a temperature of 90° C. and an average residence time of one hour (i.e., scale of polymerization: 5 liters).

Then, to the polymerization solution drawn out through the bottom of the reactor was added a small amount of methanol so as to terminate the polymerization reaction. The polymerization solution was subjected to a steam stripping treatment to separate a copolymer from the solvent, and the copolymer was dried at 100° C. for 24 hours under reduced pressure (100 mmHg).

Thus, an ethylene-1-butene-MOD random copolymer was obtained in an amount of 280 g per hour.

In the random copolymer obtained, the units derived from ethylene and the units derived from 1-butene were contained in a molar ratio of 79/21 (ethylene units/1-butene units), and the units derived from 7-methyl-1,6-octadiene (MOD) were contained in amounts of 2.3% by mol.

As for this random copolymer, the iodine value was 16, the intrinsic viscosity ($\eta$) as measured in Decalin (dechydronaphthalene, E. I. du Pont de Nemours & Co., Wilmington, Del.) at 135° C. was 2.4 dl/g, the intensity ratio of T$\alpha\beta$ to T$\alpha\alpha$ in the $^{13}$C-NMR spectrum was less than 0.01, the B value was 1.08, the glass transition temperature Tg was −58° C., and the g$\eta$* value was 1.05. The results are set forth in Table 2.

Examples 2-9

An ethylene-$\alpha$-olefin-nonconjugated polyene random copolymer was prepared in the same manner as in Example 1 except that the copolymerization reaction was carried out under the polymerization conditions shown in Table 1 in place of the conditions of Example 1. The results are set forth in Table 2.

Example 10

An ethylene-propylene-ethylidenenorbornene (ENB) random copolymer was prepared in the same manner as in Example 3 except that propylene was used in place of 1-butene. The results are set forth in Table 2.

TABLE 1

| | Ex. 1 | Ex. 2 | Ex. 3 | Ex. 4 | Ex. 5 |
|---|---|---|---|---|---|
| Hexane flow rate (l/hr) | 3.185 | 3.185 | 3.185 | 3.185 | 1.685 |
| Mixed solution of Zr compound.methyl aluminoxane | | | | | |
| Kind of Zr compound | Compound A | Compound A | Compound A | Compound A | Compound A |
| Zr concentration (mmol/l) | 0.67 | 0.67 | 0.67 | 0.67 | 0.67 |
| Al atom concentration (mmol/l) | 200 | 200 | 200 | 200 | 200 |
| Flow rate of catalyst solution (l/hr) | 0.015 | 0.015 | 0.015 | 0.015 | 0.015 |
| Solution of triisobutyl-aluminum/hexane (l/hr) | 0.3 | 0.3 | 0.3 | 0.3 | 0.3 |
| (c) Hexane solution of nonconjugated polyene | | | | | |
| Kind of nonconjugated polyene | MOD*[1] | MOD | ENB*[2] | ENB | MOD |
| Polyene concentration (l/l) | 0.15 | 0.15 | 0.20 | 0.20 | 0.15 |
| Flow rate (l/hr) | 1.5 | 1.5 | 1.5 | 1.5 | 1.5 |
| (a) Ethylene flow rate (l/hr) | 200 | 200 | 200 | 200 | 200 |
| (b) $\alpha$-olefin | | | | | |
| Kind | 1-butene | 1-butene | 1-butene | 1-butene | 1-octene |
| Flow rate*[3] (l/hr) | 155 | 250 | 100 | 250 | 1.5 |
| (c) Polymerization temperature (°C.) | 90 | 90 | 90 | 90 | 70 |

| | Ex. 6 | Ex. 7 | Ex. 8 | Ex. 9 | Ex. 10 |
|---|---|---|---|---|---|
| Hexane flow rate (l/hr) | 1.685 | 3.185 | 3.185 | 3.185 | 3.185 |

TABLE 1-continued

| Mixed solution of Zr compound methyl aluminoxane | | | | | |
|---|---|---|---|---|---|
| Kind of Zr compound | Compound A | Compound B | Compound C | Compound D | Compound A |
| Zr concentration (mmol/l) | 0.67 | 0.67 | 0.67 | 0.67 | 0.67 |
| Al atom concentration (mmol/l) | 200 | 200 | 200 | 200 | 200 |
| Flow rate of catalyst solution (l/hr) | 0.015 | 0.015 | 0.015 | 0.015 | 0.015 |
| Solution of triisobutylaluminum/hexane (l/hr) | 0.3 | 0.3 | 0.3 | 0.3 | 0.3 |
| (c) Hexane solution of nonconjugated polyene | | | | | |
| Kind of nonconjugated polyene | ENB | ENB | ENB | ENB | ENB |
| Polyene concentration (l/l) | 0.20 | 0.20 | 0.20 | 0.20 | 0.15 |
| Flow rate (l/hr) | 1.5 | 1.5 | 1.5 | 1.5 | 1.5 |
| (a) Ethylene flow rate (l/hr) | 200 | 200 | 200 | 200 | 200 |
| (b) α-olefin | | | | | |
| Kind | 1-octene | 1-butene | 1-butene | 1-butene | propylene |
| Flow rate*[3] (l/hr) | 1.5 | 100 | 100 | 100 | 100 |
| (c) Polymerization temperature (°C.) | 70 | 90 | 90 | 90 | 90 |

*[1]MOD: 7-methyl-1,6-octadiene
*[2]ENB: ethylidenenorbornene,
*[3]1-butene is fed in gas phase (gas volume flow rate) and 1-octene is fed in liquid phase (liquid volume flow rate)

TABLE 2

| | Ex. 1 | Ex. 2 | Ex. 3 | Ex. 4 | Ex. 5 |
|---|---|---|---|---|---|
| Yield of copolymerized rubber (g/hr) | 280 | 130 | 250 | 105 | 130 |
| Polymerization activity (g/polymer/mmol Zr · hr) | 28,000 | 13,000 | 25,000 | 10,500 | 13,000 |
| Component of copolymerized rubber | Et./1-Bu./MOD | Et./1-Bu./MOD | Et./1-Bu./ENB | Et./1-Bu./ENB | Et./1-Oc./MOD |
| (a) ethylene/(b) α-olefin (molar ratio) | 79/21 | 64/36 | 88/12 | 62/38 | 89/11 |
| (b) Content of non-conjugated polyene (mole %) | 2.3 | 2.0 | 1.9 | 1.8 | 2.5 |
| Iodine value | 16 | 13 | 15 | 11 | 16 |
| Intrinsic viscocity (η) (dl/g) | 2.4 | 1.5 | 2.6 | 1.4 | 2.0 |
| Tαβ/Tαα (= D) | less than 0.01 | less than 0.01 | less than 0.01 | less than 0.01 | less than 0.01 |
| B value | 1.08 | 1.04 | 1.01 | 1.12 | 1.11 |
| Tg (°C.) | −58 | −67 | −53 | −57 | −66 |
| gη* | 1.05 | 1.09 | 0.99 | 1.10 | 1.00 |

| | Ex. 6 | Ex. 7 | Ex. 8 | Ex. 9 | Ex. 10 |
|---|---|---|---|---|---|
| Yield of copolymerized rubber (g/hr) | 95 | 295 | 280 | 330 | 365 |
| Polymerization activity (g/polymer/mmol Zr · hr) | 9,500 | 29,500 | 28,000 | 33,000 | 36,500 |
| Component of copolymerized rubber | Et./1-Oc./ENB | Et./1-Bu./ENB | Et./1-Bu./ENB | Et./1-Bu./ENB | Et./Pr./ENB |
| (a) ethylene/(b) α-olefin (molar ratio) | 87/13 | 86/14 | 87/13 | 84/16 | 78/22 |
| (b) Content of non-conjugated polyene (mole %) | 2.7 | 1.8 | 1.9 | 2.2 | 2.9 |
| Iodine value | 17 | 14 | 14 | 16 | 22 |
| Intrinsic viscocity (η) (dl/g) | 2.2 | 2.4 | 2.0 | 2.3 | 3.9 |
| Tαβ/Tαα (= D) | less than 0.01 | less than 0.01 | less than 0.01 | less than 0.01 | less than 0.01 |
| B value | 1.04 | 1.00 | 1.05 | 1.09 | 1.03 |
| Tg (°C.) | −55 | −54 | −53 | −50 | −49 |
| | 1.04 | 1.07 | 1.18 | 1.15 | 0.96 |

Et.: Ethylene,
1-Oc.: 1-Octene,
ENB: Ethylidenenorbornene
1-Bu.: 1-butene,
MOD: 7-methyl-1,6-octadiene
Pr.: Propylene

Comparative Example 1

In a 2-liter polymerization reactor equipped with a stirrer, ethylene, 1-butene and 7-methyl-1,6-octadiene were continuously copolymerized in the following manner.

To the polymerization reactor were continuously fed, through the top of the reactor, a hexane solution of 7-methyl-1,6-octadiene (MOD) (concentration: 36 g/l) at a feed rate of 0.5 l/hr, a hexane solution of VO(OC$_2$H$_5$)Cl$_2$ (concentration: 8 mmol/l) as a catalyst at a feed rate of 0.5 l/hr, a hexane solution of ethylaluminum sesquichloride [Al(C$_2$H$_5$)$_{1.5}$Cl$_{1.5}$] (concentration: 64 mmol/l) at a feed rate of 0.5 l/hr and hexane at a feed rate of 0.5 l/hr, while the polymerization solution was continuously drawn out through the bottom of the reactor so that the amount of the polymerization solution in the reactor always became 1 liter.

Further, to the reactor were fed ethylene at a feed rate of 130 l/hr, 1-butene at a feed rate of 200 l/hr and hydrogen at a feed rate of 20 l/hr using a bubble tube.

The copolymerization reaction was carried out by circulating a cooling medium through a jacket provided outside the reactor, with maintaining the temperature at 20° C.

Then, the polymerization solution containing an ethylene-1-butene-MOD random copolymer obtained by the copolymerization reaction was deashed using hydrochloric acid, and a large amount of methanol was added to precipitate the polymer, followed by vacuum drying at 100° C. for 24 hours.

Thus, an ethylene-1-butene-MOD random copolymer was obtained in an amount of 280 g per hour.

In the random copolymer (rubber) obtained, the units derived from ethylene and the units derived from 1-butene were contained in a molar ratio of 74/26 (ethylene units/1-butene units), and the units derived from 7-methyl-1,6-octadiene (MOD) were contained in amounts of 2.1% by mol.

As for this random copolymer, the iodine value was 14, the intrinsic viscosity (η) as measured in Decalin (dechydronaphthalene, E. I. du Pont de Nemours & Co., Wilmington, Del.) at 135° C. was 0.13 dl/g, the intensity ratio of Tαβ to Tαα in the $^{13}$C-NMR spectrum was 1.54, and the gη* value was 1.03.

The reaction product (random copolymer) obtained by using the vanadium catalyst system had a markedly low molecular weight as described above, and it has been confirmed that this random copolymer is unable to be used as a rubber.

Example 11

Polymerization

In a 15-liter stainless steel polymerization reactor equipped with a stirrer, ethylene, 1-butene and ethylidenenorbornene (ENB) were continuously copolymerized in the following manner.

First, to the polymerization reactor were continuously fed, through the top of the reactor, dehydrated and purified hexane at a feed rate of 3.185 l/hr, the catalyst solution containing the zirconium compound A and methylaluminoxane, which was obtained in Example 1, at a feed rate of 0.015 l/hr, a hexane solution of triisobutylaluminum (concentration: 17 mmol/l) at a feed rate of 0.3 l/hr and a hexane solution of ENB (concentration: 0.02 l/l) at a feed rate of 1.5 l/hr.

Further, to the reactor were continuously fed, through the top thereof, ethylene at a feed rate of 200 l/hr and 1-butene at a feed rate of 155 l/hr.

The copolymerization reaction was carried out under the conditions of a temperature of 80° C. and an average residence time of one hour (i.e., scale of polymerization: 5 liters).

Then, to the polymerization solution drawn out through the bottom of the reactor was added a small amount of methanol so as to terminate the polymerization reaction. The polymerization solution was subjected to a steam stripping treatment to separate a copolymer from the solvent, and the copolymer was dried at 100° C. for 24 hours under reduced pressure (100 mmHg).

Thus, an ethylene-1-butene-ENB copolymer was obtained in an amount of 250 g per hour.

In the copolymer obtained, the units derived from ethylene and the units derived from 1-butene were contained in a molar ratio of 80/20 (ethylene units/1-butene units).

As for this copolymer, the iodine value based on ENB was 15, the intrinsic viscosity ($\eta$) as measured in Decalin (dechydronaphthalene, E. I. du Pont de Nemours & Co., Wilmington, Del.) at 135° C. was 2.7 dl/g, the intensity ratio of $T\alpha\beta$ to $T\alpha\alpha$ in the $^{13}$C-NMR spectrum was less than 0.01, the B value was 1.1, the glass transition temperature Tg was −56° C. and the g$\eta$* value was 1.05. The results are set forth in Table 3.

Examples 12–16

An ethylene-α-olefin-nonconjugated polyene random copolymer was obtained in the same manner as in Example 11 except that the copolymerization reaction was carried out by varying the polymerization conditions. The results are set forth in Table 3.

TABLE 3

|  | Ex. 11 | Ex. 12 | Ex. 13 | Ex. 14 | Ex. 15 | Ex. 16 |
|---|---|---|---|---|---|---|
| Random copolymer No. | 11 | 12 | 13 | 14 | 15 | 16 |
| α-Olefin | 1-butene | 1-butene | 1-butene | 1-butene | 1-butene | 1-octene |
| Nonconjugated polyene | ENB | ENB | ENB | ENB | ENB | DCPD |

TABLE 3-continued

|  | Ex. 11 | Ex. 12 | Ex. 13 | Ex. 14 | Ex. 15 | Ex. 16 |
|---|---|---|---|---|---|---|
| Ethylene/α-Olefin (by mol) | 80/20 | 76/24 | 74/26 | 65/35 | 72/28 | 78/22 |
| Iodine value | 15 | 17 | 14 | 12 | 22 | 12 |
| ($\eta$) (dl/g) | 2.7 | 1.9 | 2.1 | 1.6 | 2.2 | 1.9 |
| $T\alpha\beta/T\alpha\alpha$ | <0.01 | <0.01 | <0.01 | <0.01 | <0.01 | <0.01 |
| B value | 1.1 | 1.1 | 1.1 | 1.0 | 1.1 | 1.0 |
| Tg (°C.) | −56 | −60 | −60 | −62 | −57 | −59 |
| g$\eta$* | 1.04 | 1.12 | 0.99 | 1.08 | 1.14 | 1.03 |

ENB: 5-ethylidene-2-norbornene
DCPD: dicyclopentadiene

Examples 17–22

A crosslinked product of a rubber blend (rubber composition) containing the ethylene-α-olefin-nonconjugated polyene random copolymer prepared in each of Examples 11 to 16 and other components in the amounts shown in Table 4 was obtained. In detail, the ethylene-α-olefin-nonconjugated polyene random copolymer, stearic acid, zinc white, paraffinic oil and carbon black were kneaded for 10 minutes using a 1.7-liter Banbury mixer (manufactured by Kobe Seikosho K. K.). In a 6-inch roll (F/B=50/50° C.), to the kneadate were further added a vulcanizing agent and a vulcanization accelerator and they were kneaded to obtain a rubber blend.

The rubber blend was vulcanized by pressing it at 160° C. for 10 minutes, to obtain a crosslinked sheet having a thickness of 2 mm.

A specimen for the permanent compression set (CS) test was obtained by vulcanizing a right circular cylindrical rubber blend at 160° C. for 15 minutes.

The rubber composition and its vulcanized product (crosslinked sheet) obtained above were evaluated by the following test methods. The components of the unvulcanized rubber composition are set forth in Table 4, and the test results of the vulcanized product are set forth in Table 5.

(1) Tensile test ($T_B$ and $E_B$)

From the vulcanized rubber sheet, a dumbbell specimen of No. 3 described in JIS-K-6301 was punched. The specimen was subjected to a tensile test in accordance with a method defined by JIS-K-6301, Section 3, under the conditions of a measuring temperature of 25° C. and a tensile rate of 500 mm/min, to measure tensile stress at break TB and tensile elongation at break $E_B$.

(2) Hardness test (Hs hardness)

The hardness test was carried out in accordance with JIS-K-6301 to measure spring hardness Hs (JIS A hardness).

(3) Aging test (AR($T_B$), AR($E_B$) and $A_H$)

The specimen was subjected to air-oven aging test at 125° C. for 70 hours, and the retention ratios of the properties after aging to the properties before aging, i.e., tensile strength retention ratio AR($T_B$), elongation retention ratio AR($E_B$) and change of hardness $A_H$ (JIS A), were determined.

(4) Permanent compression set test (CS)

The permanent compression set test was carried out in accordance with JIS-K-6301 to measure low-temperature permanent compression set (CS) at −40° C. after 22 hours. As the low-temperature permanent compression set becomes smaller, the low-temperature flexibility becomes better.

TABLE 4

| Component | Part(s) by weight |
|---|---|
| Ethylene-α-olefin nonconjugated polyene random copolymer | 100 |
| FEF-HS carbon (Niteron #10, Shinnittetsu Kagaku K.K.) | 55 |
| Paraffinic oil (F-300, Japan Energy K.K.) | 60 |
| Stearic acid | 1 |
| Sulfur | 0.5 |
| Zinc White No. 1 | 5 |
| MBT (Sunseller M, Sanshin Kagaku K.K.) | 0.2 |
| CBS (Sunseller CZ, Sanshin Kagaku K.K.) | 0.3 |
| TMTD (Sunseller TT, Sanshin Kagaku K.K.) | 0.8 |
| DPTT (Sunseller TRA, Sanshin Kagaku K.K.) | 0.8 |

MBT: 2-mercaptobenzothiazole
CBS: N-cyclohexyl-2-benzothiazolyl sulfenamide
TMTD: tetramethylthiuram disulfide
DPTT: dipentamethylenethiuram tetrasulfide

TABLE 5

| | Ex. 17 | Ex. 18 | Ex. 19 | Ex. 20 | Ex. 21 | Ex. 22 |
|---|---|---|---|---|---|---|
| Random copolymer No. | 11 | 12 | 13 | 14 | 15 | 16 |
| $T_B$ (kg/cm$^2$) | 132 | 105 | 91 | 86 | 112 | 93 |
| $E_B$ (%) | 600 | 560 | 580 | 550 | 480 | 510 |
| Hs hardness (JIS A) | 54 | 52 | 49 | 48 | 52 | 48 |
| AR($T_B$) (%) | 94 | 104 | 94 | 89 | 106 | 92 |
| AR($E_B$) (%) | 69 | 61 | 56 | 54 | 48 | 60 |
| $A_H$ (JIS A) | +7 | +10 | +12 | +13 | +16 | +11 |
| CS (−40° C., 22 hr) (%) | 83 | 65 | 54 | 38 | 56 | 71 |

What is claimed is:

1. A process for preparing an ethylene-α-olefin-nonconjugated polyene random copolymer, comprising randomly copolymerizing (a) ethylene, (b) an α-olefin of 3 or more carbon atoms and (c) a nonconjugated polyene in the presence of a metallocene catalyst containing a metallocene compound represented by the following formula (I) or (II);

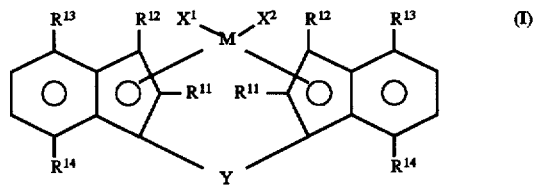

wherein

M is a transition metal of Group IVB of the periodic table, $R^{11}$ and $R^{12}$ may be the same as or different from each other, and are each hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group, $R^{13}$ is an alkyl group of 1 to 20 carbon atoms, $R^{14}$ is an alkyl group of 1 to 20 carbon atoms, $X^1$ and $X^2$ may be the same as or different from each other, and are each hydrogen, a halogen atom, a hydrocarbon group of 1 to 20 carbon atoms, a halogenated hydrocarbon group of 1 to 20 carbon atoms, a silicon-containing group, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^{15}$—, —P(R$^{15}$)—, —P(O)(R$^{15}$)—, —BR$^{15}$— or —AlR$^{15}$— (R$^{15}$ is hydrogen, a halogen atom, a hydrocarbon group of 1 to 20 carbon atoms or a halogenated hydrocarbon group of 1 to 20 carbon atoms);

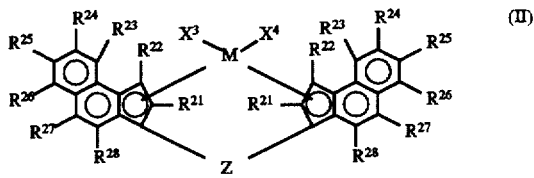

wherein

M is a transition metal of Group IVB of the periodic table, $X^3$ and $X^4$ may be the same as or different from each other, and are each hydrogen, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms, an arylalkenyl group of 8 to 40 carbon atoms, OH group or a halogen atom, plural $R^{21}$ may be the same as or different from each other, and are each hydrogen, a halogen atom, an alkyl group of 1 to 10 carbon atoms which may be halogenated, an aryl group of 6 to 10 carbon atoms, —NR$_2$, —SR, —OSiR$_3$, —SiR$_3$ or —PR$_2$ (R is a halogen atom, an alkyl group of 1 to 10 carbon atoms or an aryl group of 6 to 10 carbon atoms), $R^{22}$ to $R^{28}$ are each the same as $R^{21}$, or adjacent two of $R^{22}$ to $R^{28}$ may form an aromatic or aliphatic ring together with atoms bonded to them, and Z is

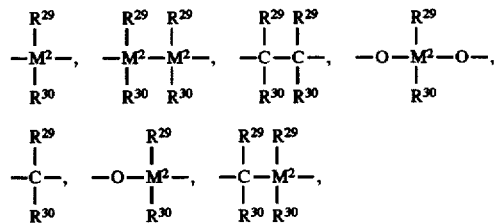

=BR$^{29}$, =AlR$^{29}$, —Ge, —Sn—, —O—, —S—, =SO, =SO$_2$, =NR$^{29}$, =CO, =PR$^{29}$ or =P(O)R$^{29}$ (R$^{29}$ and R$^{30}$ may be the same as or different from each other, and are each hydrogen, a halogen atom, an alkyl group of 1 to 10 carbon atoms, a fluoroalkyl group of 1 to 10 carbon atoms, an aryl group of 6 to 10 carbon atoms, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon atoms or an alkylaryl group of 7 to 40 carbon atoms, or R$^{29}$ and R$^{30}$ form a ring together with atoms bonded to them, and $M^2$ is silicon, germanium or tin); wherein the resulting random copolymer has the following properties:

(i) said copolymer contains units derived from ethylene (a) and units derived from the α-olefin of 3 or more carbon atoms (b) in a molar ratio, (a)/(b), of 40/60 to 95/5, (ii) the iodine value is in the range of 1 to 50, (iii) the intrinsic viscosity (η), as measured in decahydronaphthalene at 135° C., is in the range of 0.1 to 8.0 dl/g, (iv) the intensity ratio D of Tαβ to Tαα in the $^{13}$C-NMR spectrum, Tαβ/Tαα, is not more than 0.5, (v) the B value, as determined by the $^{13}$C-NMR spectrum and the following formula, is in the range of 1.00 to 1.50, B value=$(P_{OE})/(2 \cdot (P_E) \cdot (P_O))$ wherein $(P_E)$ is a molar fraction of the units derived from ethylene (a) in the random copolymer, $(P_O)$ is a molar fraction of the units derived from the α-olefin (b) in the random copolymer, and $(P_{OE})$ is a proportion of the number of the α-olefin-ethylene sequences to the number of all the dyad sequences in the random copolymer, (vi) the glass transition temperature, Tg, as measured by DSC is not higher than −50° C., and (vii) the ratio gη* of the intrinsic viscosity (η) of the random copolymer defined above to the intrinsic viscosity $(η)_{blank}$ of a linear ethylene-propylene copolymer having the same weight-average molecular weight, by light scattering method, as the ethylene-α-olefin-nonconjugated polyene random copolymer and having an ethylene content of 70 mol %, $(η)/(η)_{blank}$, is more than 0.9.

2. The process for preparing an ethylene-α-olefin-nonconjugated polyene random copolymer as claimed in claim 1, wherein the α-olefin (b) is an α-olefin of 4 to 10 carbon atoms.

* * * * *